(12) United States Patent
Fujita et al.

(10) Patent No.: US 8,605,330 B2
(45) Date of Patent: Dec. 10, 2013

(54) IMAGE PROCESSING APPARATUS AND METHOD FOR CONVERTING MULTIVALUE IMAGE DATA INTO MULTIVALUE IMAGE DATA CORRESPONDING TO RELATIVE MOVEMENTS

(75) Inventors: Takashi Fujita, Kawasaki (JP); Fumihiro Goto, Kawasaki (JP); Akitoshi Yamada, Yokohama (JP); Akihiko Nakatani, Kawasaki (JP); Mitsuhiro Ono, Tokyo (JP); Fumitaka Goto, Tokyo (JP); Okinori Tsuchiya, Yokohama (JP); Rie Kajihara, Minoo (JP); Ayumi Sano, Kawasaki (JP); Tomokazu Ishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 221 days.

(21) Appl. No.: 13/051,150

(22) Filed: Mar. 18, 2011

(65) Prior Publication Data
US 2011/0235071 A1    Sep. 29, 2011

(30) Foreign Application Priority Data
Mar. 26, 2010    (JP) .................................. 2010-072194

(51) Int. Cl.
*H04N 1/60*    (2006.01)
(52) U.S. Cl.
USPC ......... 358/1.9; 358/3.01; 358/3.03; 358/3.06; 347/9; 347/14
(58) Field of Classification Search
None
See application file for complete search history.

(56) References Cited

U.S. PATENT DOCUMENTS

| 7,924,464 | B2 * | 4/2011 | Kakutani | 358/3.01 |
|---|---|---|---|---|
| 8,253,980 | B2 * | 8/2012 | Murayama et al. | 358/3.06 |
| 8,405,876 | B2 * | 3/2013 | Nakatani et al. | 358/3.03 |
| 2009/0161165 | A1 * | 6/2009 | Fujimoto et al. | 358/2.1 |
| 2010/0026746 | A1 * | 2/2010 | Fujita et al. | 347/12 |
| 2011/0080615 | A1 * | 4/2011 | Ono et al. | 358/3.23 |
| 2011/0085183 | A1 * | 4/2011 | Tsuchiya et al. | 358/1.2 |
| 2011/0085189 | A1 * | 4/2011 | Sano et al. | 358/1.9 |
| 2011/0122178 | A1 * | 5/2011 | Goto et al. | 347/9 |
| 2011/0141178 | A1 * | 6/2011 | Kawai et al. | 347/14 |
| 2011/0221806 | A1 * | 9/2011 | Sumiuchi | 347/9 |
| 2011/0234661 | A1 * | 9/2011 | Goto et al. | 347/9 |

FOREIGN PATENT DOCUMENTS

| JP | 2000-103088 | | 4/2000 |
|---|---|---|---|
| JP | 2000103088 | A * | 4/2000 |

* cited by examiner

*Primary Examiner* — Dung Tran
(74) *Attorney, Agent, or Firm* — Fitzpatrick, Cella, Harper & Scinto

(57) ABSTRACT

An image processing apparatus and an image processing method are provided which, when forming an image using a plurality of different sizes of dots, can produce a satisfactory image free from problematical levels of density unevenness, graininess and insufficient density with any of these dot sizes. To this end, when printing on pixel areas of a print medium by a plurality of relative movements between the printing unit and the print medium, the dot overlap rate of a dot size that tends to show density unevenness is set higher than that of a dot size that tends to show other image impairments more conspicuously than the density unevenness. This results in a satisfactory image that eliminates such image impairments as density unevenness, graininess and density insufficiency in the entire grayscale range.

9 Claims, 23 Drawing Sheets

FIG.4A – FIG.4G

FIG.4A
FIRST PLANE:
| 1 | 0 | 1 | 0 |
|---|---|---|---|
| 0 | 1 | 0 | 0 |
| 0 | 0 | 1 | 0 |

SECOND PLANE:
| 0 | 0 | 1 | 0 |
| 1 | 0 | 0 | 0 |
| 0 | 1 | 0 | 1 |

FIG.4B
FIRST PLANE:
| 1 | 0 | 1 | 0 |
| 0 | 1 | 0 | 0 |
| 0 | 0 | 1 | 0 |

SECOND PLANE:
| 0 | 0 | 1 | 0 |
| 1 | 1 | 0 | 0 |
| 0 | 0 | 0 | 1 |

FIG.4C
FIRST PLANE:
| 1 | 0 | 1 | 0 |
| 0 | 1 | 0 | 0 |
| 0 | 0 | 1 | 0 |

SECOND PLANE:
| 0 | 0 | 1 | 0 |
| 1 | 1 | 0 | 0 |
| 0 | 1 | 0 | 0 |

FIG.4D
FIRST PLANE:
| 1 | 0 | 1 | 0 |
| 0 | 1 | 0 | 0 |
| 0 | 0 | 1 | 0 |

SECOND PLANE:
| 1 | 0 | 1 | 0 |
| 0 | 1 | 0 | 0 |
| 0 | 0 | 0 | 1 |

FIG.4E
FIRST PLANE:
| 1 | 0 | 1 | 0 |
| 0 | 1 | 0 | 0 |
| 0 | 0 | 1 | 0 |

SECOND PLANE:
| 1 | 0 | 1 | 0 |
| 0 | 1 | 0 | 0 |
| 0 | 0 | 1 | 0 |

FIG.4F
FIRST PLANE:
| 1 | 0 | 1 | 0 |
| 0 | 1 | 0 | 0 |
| 0 | 0 | 1 | 0 |

SECOND PLANE:
| 0 | 0 | 1 | 0 |
| 0 | 1 | 0 | 0 |
| 0 | 0 | 1 | 0 |

FIG.4G
FIRST PLANE:
| 1 | 0 | 1 | 0 |
| 0 | 1 | 0 | 0 |
| 0 | 0 | 1 | 0 |

SECOND PLANE:
| 0 | 0 | 0 | 0 |
| 1 | 0 | 0 | 0 |
| 0 | 0 | 0 | 1 |

FIG.4H

| | TOTAL NUMBER OF DOTS | NUMBER OF OVERLAPPING DOTS | DOT OVERLAP RATE (%) |
|---|---|---|---|
| (A) | 8 | 0 | 0 (=0÷8×100) |
| (B) | 8 | 2 | 25 (=2÷8×100) |
| (C) | 8 | 4 | 50 (=4÷8×100) |
| (D) | 8 | 6 | 75 (=6÷8×100) |
| (E) | 8 | 8 | 100 (=8÷8×100) |
| (F) | 7 | 6 | 86 (=6÷7×100) |
| (G) | 6 | 2 | 33 (=2÷6×100) |

DIFFUSION MATRIX A

|   | ● | 9 | 3 |
|---|---|---|---|
| 5 | 9 | 3 |   |
|   | 3 |   |   |

●REPRESENTS A PIXEL TO BE PROCESSED

FIG.8A

DIFFUSION MATRIX B

|   |   | ● | 2 | 1 |
|---|---|---|---|---|
| 1 | 1 | 2 | 1 |   |

●REPRESENTS A PIXEL TO BE PROCESSED

FIG.8B

IMAGE PROCESSING APPARATUS AND METHOD FOR CONVERTING MULTIVALUE IMAGE DATA INTO MULTIVALUE IMAGE DATA CORRESPONDING TO RELATIVE MOVEMENTS

BACKGROUND OF THE INVENTION

1. Field of the Invention

The present invention relates to an image processing apparatus and an image processing method which process multivalue image data associated with an area of interest on a print medium to print an image on the area by moving a printing unit relative to the area two or more times or moving a plurality of printing element groups relative to the same area.

2. Description of the Related Art

As a technology to alleviate density unevenness and stripes in an image printed by an inkjet printing apparatus, there has been known a multipass printing method which completes an image of an area on a print medium by performing a plurality of printing scans over that area. Even with the multipass printing method, however, there may occur a shift in a dot printed position between a preceding printing scan and a subsequent printing scan. Such a dot position shift or deviation can lead to variations in dot coverage rate, resulting in image impairments such as density variations and density unevenness.

To alleviate such image impairments, a method has been known which involves dividing image data in the form of multivalue image data before being binarized into different printing scans and then binarizing the divided multivalue image data independently of each other or in an uncorrelated manner (Japanese Patent Laid-Open No. 2000-103088). FIG. 9A shows an arrangement of dots printed according to image data processed by the method of Japanese Patent Laid-Open No. 2000-103088. In the figure, solid black circles 1501 represent dots printed in a first printing scan; blank circles 1502 represent dots printed in a second printing scan; and gray circles 1503 represent dots printed overlappingly by the first and the second printing scan.

With this arrangement, if a group of dots printed in the first printing scan and a group of dots printed in the second printing scan are shifted in the main scan direction or subscan direction, the dot coverage rate over the print medium does not change so much. The reason for this is that while areas newly emerge in which dots printed in the first scan and dots printed in the second scan overlap each other, there are also areas where two dots that are supposed to overlap each other do not overlap.

However, positively trying to make dots overlap by using the method of Japanese Patent Laid-Open No. 2000-103088 can deteriorate graininess and insufficient density. For example, in highlighted areas where graininess shows easily, it is preferred that a small number of dots (1701, 1702) be evenly scattered, a predetermined distance apart from each other, as shown in FIG. 9B. However, in the construction disclosed in the Japanese Patent Laid-Open No. 2000-103088, there occur in places areas in which dots are printed overlappingly (1603) or adjoiningly (1601, 1602), as shown in FIG. 9C. These dot lumps show and degrade the graininess. In high-density areas where importance is given to maximum density value, too many overlapping dots can expose blank areas, resulting in an insufficient density. So, the percentage of areas where dots overlap (dot overlap rate) is preferably adjusted not to cause undue density unevenness, graininess and insufficient density in output images.

Particularly when images are formed using a plurality of ink dots of the same color but of different sizes, as has been done in recent years, the levels of density unevenness, graininess and density insufficiency vary depending on what percentage of each size of dots is used in which grayscale region. That is, which of the density unevenness suppression, graininess reduction and the avoidance of density insufficiency should be given how much priority changes from one dot size to another. So, when a plurality of dot sizes are used, it is desired that a dot overlap rate be properly adjusted according to the dot size.

In the method disclosed in Japanese Patent Laid-Open No. 2000-103088, because a quantization operation is performed independently in individual planes without having these planes correlated to each other at all, the dot overlap rate is determined solely by the quantization method. That is, changing the dot overlap rate according to the dot size or adjusting the dot overlap rate within a target range have not been possible. As a result, it has been difficult to produce an image that is free from problematical levels of density unevenness, graininess and density insufficiency in the entire grayscale range.

SUMMARY OF THE INVENTION

The present invention has been accomplished to solve the aforementioned problem. It is therefore an object of this invention to provide an image processing apparatus and an image processing method capable of producing an image which, when formed by using a plurality of different dot sizes, has density unevenness, graininess and insufficient density so restrained that no noticeable image impairments occur.

In a first aspect of the present invention, there is provided an image processing apparatus to process input image data for pixel area of a print medium so that the input image data can be printed on the associated pixel area by a plurality of relative movements between a printing unit and the print medium, the printing unit being adapted to print a first dots and a second dots, the second dots having the same color as the first dots and smaller size than the first dots, the image processing apparatus comprising: a generating unit configured to generate a first multivalue data corresponding to the first dots and a second multivalue data corresponding to the second dots on the basis of the input image data; a conversion unit configured to convert each of the first and second multivalue data into plurality of pieces multivalue data corresponding to the plurality of relative movements; and a quantization unit configured to quantize each of the plurality of pieces of multivalue data corresponding to the first dots and the second dots respectively; wherein the conversion unit converts into plurality of pieces of multivalue data corresponding to the plurality of relative movements for each of the first dots and the second dots so that a bias of a distribution ratio among the plurality of pieces of multivalue data, that have been converted from each of the first multivalue data and the second multivalue data, is differentiated between the first dots and the second dots.

In a second aspect of the present invention, there is provided an image processing apparatus to process input image data for pixel area of a print medium so that the input image data can be printed on the associated pixel area by a plurality of relative movements between a printing unit and the print medium, the printing unit being adapted to print a first dots and a second dots, the second dots having the same color as the first dots and smaller size than the first dots, the image processing apparatus comprising: a generating unit configured to generate a first multivalue data corresponding to the first dots and a second multivalue data corresponding to the second dots on the basis of the input image data; a conversion unit configured to convert each of the first and second multivalue data into plurality of pieces multivalue data corresponding to the plurality of relative movements; and a quantization unit configured to quantize each of the plurality of pieces of multivalue data corresponding to the first dots and the second dots respectively; wherein the plurality of pieces of multivalue data corresponding to the plurality of relative movements for each of the first dots and the second dots, include a multivalue data for a first scan and a multivalue data for a second scan; wherein the quantization unit quantizes, for each of the first dots and the second dots, the multivalue data for the second scan based on the multivalue data for the first scan and also the multivalue data for the first scan based on the multivalue data for the second scan so that the number of combination of the multivalue data corresponding to the first scan and the multivalue data corresponding to the second scan for the pixel area, is different between the first dot and the second dot.

In a third aspect of the present invention, there is provided an image processing apparatus to process input image data for pixel area of a print medium so that the input image data can be printed on the associated pixel area by a plurality of relative movements between a printing unit and the print medium, the printing unit being adapted to print a first dots and a second dots, the second dots having the same color as the first dots and smaller size than the first dots, the image processing apparatus comprising: a generating unit configured to generate a first multivalue data corresponding to the first dots and a second multivalue data corresponding to the second dots on the basis of the input image data; a conversion unit configured to convert each of the first and second multivalue data into plurality of pieces multivalue data corresponding to the plurality of relative movements; and a quantization unit configured to quantize each of the plurality of pieces of multivalue data corresponding to the first dots and the second dots respectively; wherein the quantization unit includes: (i) a unit which generates, for each of the first dots and the second dots, a plurality of pieces of L-value quantized data corresponding to the plurality of relative movements by an L-value (L is an integer equal to or greater than 3) quantization operation; and (ii) a unit which converts, for each of the first dots and the second dots, each of the plurality of pieces of L-value quantized data through dot patterns into binary data wherein the dot pattern is different between the first dots and the second dots.

In a fourth aspect of the present invention, there is provided a storage medium storing a computer-readable program wherein the computer-readable program causes a computer to function as the image processing apparatus disclosed above.

In a fifth aspect of the present invention, there is provided an image processing method to process input image data for pixel area of a print medium so that the input image data can be printed on the associated pixel area by a plurality of relative movements between a printing unit and the print medium, the printing unit being adapted to print a first dots and a second dots, the second dots having the same color as the first dots and smaller size than the first dots, the image processing apparatus comprising: a generating step to generate a first multivalue data corresponding to the first dots and a second multivalue data corresponding to the second dots on the basis of the input image data; a conversion step to convert each of the first and second multivalue data into plurality of pieces multivalue data corresponding to the plurality of relative movements; and a quantization step to quantize each of the plurality of pieces of multivalue data corresponding to the first dots and the second dots respectively; wherein the conversion step converts into plurality of pieces of multivalue data corresponding to the plurality of relative movements for each of the first dots and the second dots so that a bias of a distribution ratio among the plurality of pieces of multivalue data, that have been converted from each of the first multivalue data and the second multivalue data, is differentiated between the first dots and the second dots.

In a sixth aspect of the present invention, there is provided an image processing method to process input image data for pixel area of a print medium so that the input image data can be printed on the associated pixel area by a plurality of relative movements between a printing unit and the print medium, the printing unit being adapted to print a first dots and a second dots, the second dots having the same color as the first dots and smaller size than the first dots, the image processing apparatus comprising: a generating step to generate a first multivalue data corresponding to the first dots and a second multivalue data corresponding to the second dots on the basis of the input image data; a conversion step to convert each of the first and second multivalue data into plurality of pieces multivalue data corresponding to the plurality of relative movements; and a quantization step to quantize each of the plurality of pieces of multivalue data corresponding to the first dots and the second dots respectively; wherein the plurality of pieces of multivalue data corresponding to the plurality of relative movements for each of the first dots and the second dots, include a multivalue data for a first scan and a multivalue data for a second scan, wherein the quantization step quantizes, for each of the first dots and the second dots, the multivalue data for the second scan based on the multivalue data for the first scan and also the multivalue data for the first scan based on the multivalue data for the second scan so that the number of combination of the multivalue data corresponding to the first scan and the multivalue data corresponding to the second scan for the pixel area, is different between the first dot and the second dot.

Further features of the present invention will become apparent from the following description of exemplary embodiments (with reference to the attached drawings).

BRIEF DESCRIPTION OF THE DRAWINGS

FIGS. 4A-4H are diagrams to explain a dot overlap rate;

FIGS. 8A and 8B are diagrams showing examples of error diffusion matrix;

DESCRIPTION OF THE EMBODIMENTS

While the following embodiments take up an inkjet printing apparatus as an example, this invention is not limited to the inkjet printing apparatus but is applicable to any other apparatus as long as they print an image on a print medium during a relative movement between a dot printing unit and a print medium.

The "relative movement (or relative scan)" between the printing unit and the print medium means an operation of moving (or scanning) the printing unit relative to the print medium or an operation of moving (or conveying) the print medium relative to the printing unit. The printing unit refers to one or more printing element groups (nozzle arrays) or one or more print heads.

In the image processing apparatus described in the following, data processing is performed to produce an image in an area of interest (predetermined area) on a print medium by moving the printing unit relative to that area on the print medium a plurality of times or by moving a plurality of printing element groups relative to the area of interest. Here the "area of interest (predetermined area)" refers to "one pixel area" microscopically and, in a macroscopic term, "an area that can be printed by one relative movement". The word "pixel area (which may also be referred to simply as a "pixel")" means a minimum unit area capable of expressing a desired grayscale level indicated multivalue image data. Meanwhile, the "area that can be printed by one relative movement" refers to an area on a print medium that is scanned by the printing unit in one relative movement, or a smaller area (e.g., one raster area).

<Overview of Printing Apparatus>

Figure 1A:
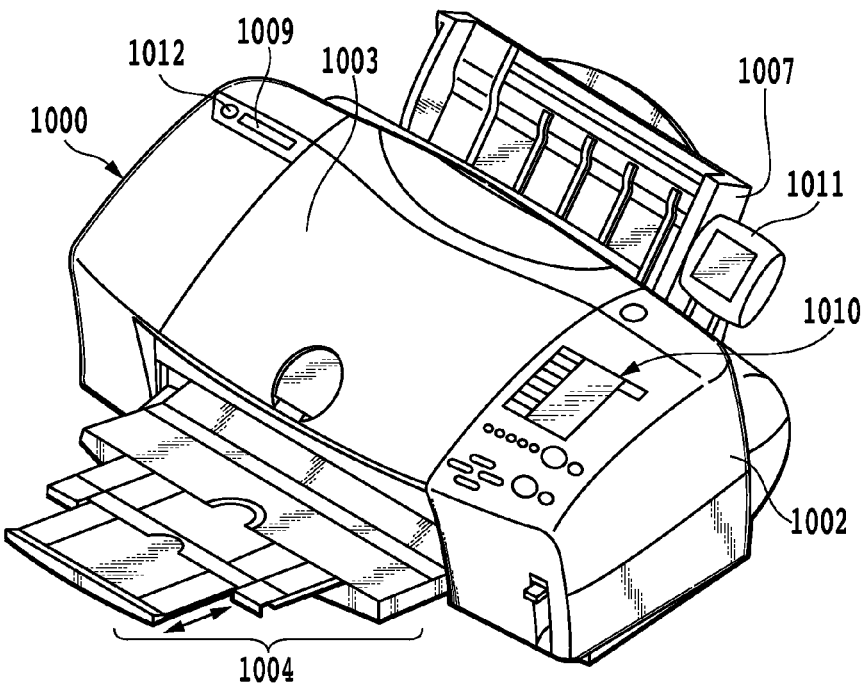
FIG. 1A is a schematic perspective view of a photo direct printer serving as an image processing apparatus of this invention.

FIG. 1A is a schematic perspective view of a photo direct printer (hereinafter referred to as a PD printer) 1000 that functions as an image processing apparatus of this invention. The PD printer 1000 has a function of receiving and printing data from a host computer, a function of directly reading and printing an image stored in a storage medium, such as a memory card, and a function of receiving and printing an image from a digital camera and a PDA or the like.

In the figure, reference number 1004 denotes a discharge tray on which printed sheets of paper can be received and stacked; and 1003 denotes an access cover that the user can open or close when he or she replaces a print head cartridge or an ink tank accommodated inside the printer body. On an operation panel 1010 provided on an upper case 1002, menu items for making various settings on printing conditions (e.g., the kind of print medium and the quality of printed image) are displayed. The user can make a desired setting according to the kind and use of an image that he is going to produce. Designated 1007 is an automatic feeder to automatically feed print medium sheets into the printer body. Denoted 1009 is a card slot into which a memory card-mounted adapter is inserted. Denoted 1012 is a USB terminal to which a digital camera is connected. At the back of the PD printer 1000 there is provided a USB connector for connection with a PC.

<Outline of Electrical Specifications of Control Unit>

Figure 2:
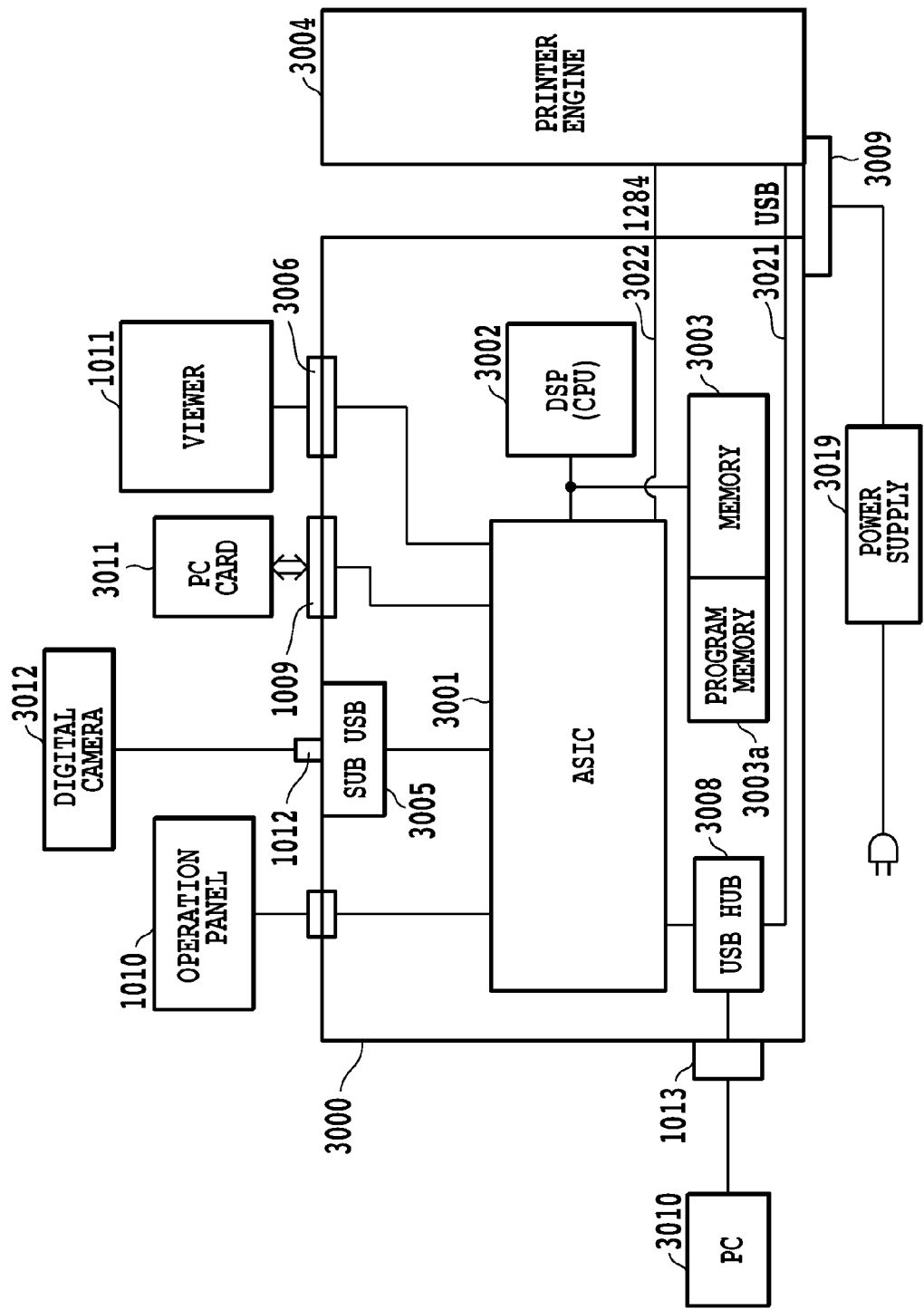
FIG. 2 is a block diagram showing a configuration of a control system in the PD printer according to one embodiment of this invention.

FIG. 2 is a block diagram showing the construction of essential parts of the PD printer 1000 in the embodiments of this invention that are involved in the control of the printer. In the figure, reference number 3000 represents a control unit (control circuit board) and 3001 represents an image processing ASIC (dedicated customized LSI). Denoted 3002 is a DSP (digital signal processor) with a CPU installed therein, which is assigned to perform a variety of control operations and image processing operations described later. A memory 3003 has a program memory 3003a to store a control program for the CPU of the DSP 3002, a RAM area to store a program being executed, and a memory area functioning as a work memory to store image data or the like. Denoted 3004 is a printer engine, in this case, for an inkjet printer to print color images using a plurality of color inks. Denoted 3005 is a USB connector as a port for connection with a digital camera (DSC) 3012. A connector 3006 is for a viewer 1011. Denoted 3008 is a USB hub which, when the PD printer 1000 prints based on the image data from the PC 3010, passes data from the PC 3010 as is, without being processed, to the printer engine 3004 through the USB 3021. This allows the connected PC 3010 to directly transfer data and signals to and from the printer engine 3004 for the printing operation (the printer in this case can function as a general PC printer). Designated 3009 is a power supply connector which receives from a power supply 3019 a DC voltage converted from a utility AC voltage. The PC 3010 is a general personal computer, 3011 a memory card (PC card) described earlier, and 3012 a digital camera (DSC). The signal transfer between the control unit 3000 and the printer engine 3004 is accomplished via the USB 3021 or an IEEE1284 bus 3022.

<Overview of Printing Unit>

Figure 1B:
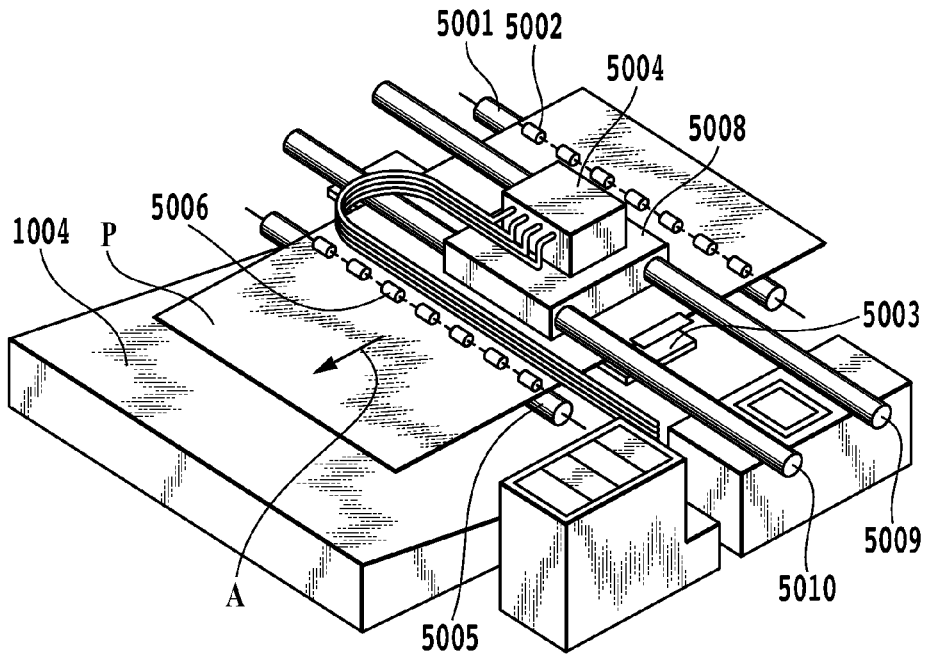
FIG. 1B is a schematic perspective view of a printing unit of a printer engine.

FIG. 1B is a perspective view showing an outline of the printing unit in the printer engine of a serial type inkjet printing apparatus according to the embodiments of this invention. A print medium P is fed by an automatic feeder 1007 to a nip portion between a conveying roller 5001 disposed on a conveying path and pinch rollers 5002 driven by the conveying roller. Then, the print medium P is conveyed by the rotation of the conveying roller 5001 in a direction of arrow A (subscan direction), guided and supported on a platen 5003. The pinch rollers 5002 are elastically urged toward the conveying roller 5001 by a pressing means not shown, such as springs. The conveying roller 5001 and the pinch rollers 5002 together constitute a first conveying means provided on an upstream side in the print medium conveyance direction.

The platen 5003 is provided at a printing position opposing a surface of an inkjet print head 5004 formed with ejection openings (ejection face) and supports the back of the print medium P to keep the distance between the surface of the print medium P and the ejection face constant. The print medium P, after being carried to the platen 5003 and printed, is held between a driving discharge roller 5005 and spurs 5006 rotated by the discharge roller and is conveyed in the direction A onto a discharge tray 1004. The discharge roller 5005 and the spurs 5006 constitute a second conveying means provided on a downstream side in the print medium conveyance direction.

The print head 5004 is removably mounted on a carriage 5008, with its ejection face opposing the platen 5003 or print medium P. The carriage 5008 is reciprocated along two guide rails 5009, 5010 by a carriage motor E0001. During this reciprocal motion, the print head 5004 executes an ink ejection operation according to a print signal. The direction in which the carriage 5008 travels is called a main scan direction and crosses the arrow A direction in which the print medium is conveyed, which is called a subscan direction. By alternating the main scan operation of the carriage 5008 and the print head 5004 (accompanied by a printing operation) and the subscan conveyance operation of the print medium, the print medium P is printed.

Figure 11A:
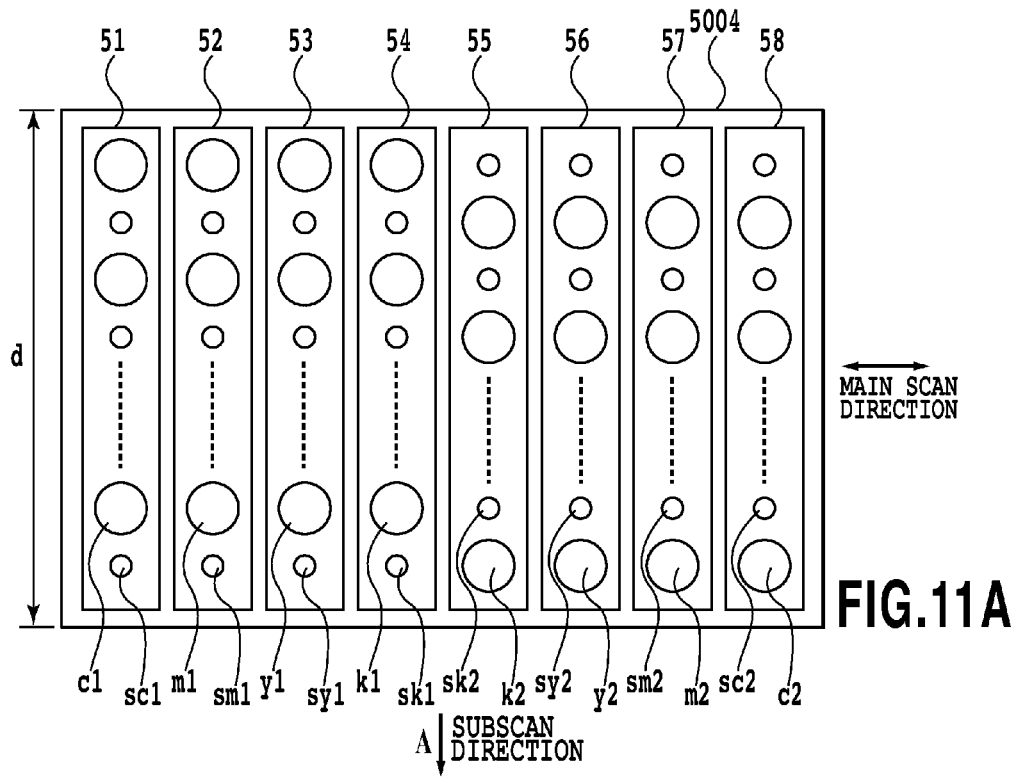
FIGS. 11A-11C show ejection opening arrays in a print head.

FIG. 11A is a schematic view of the print head 5004 as seen from the ejection opening-formed surface. In the figure, reference numbers 51 and 58 represent a first and a second cyan nozzle array (first and second printing element group), and 52 and 57 represent a first and a second magenta nozzle array. 53 and 56 represent a first and a second yellow nozzle array, and 54 and 55 represent a first and a second black nozzle array. Each of the nozzle arrays has a width d in the sub-scan direction and thus, in one printing scan, is able to print a strip of width d. Each of the nozzle arrays 51-58 has large nozzles and small nozzles positioned alternately in the subscan direction, the large nozzles ejecting relatively large ink droplets to form large dots on a print medium and the small nozzles ejecting relatively small ink droplets to form small dots on the print medium. For example, the first cyan nozzle array 51 has large dot nozzles c1 and small dot nozzles sc1 arranged alternately, and the second cyan nozzle array 58 has large dot nozzles c2 and small dot nozzles sc2 alternated in position. Paired nozzle arrays of the same color ink have their sub-scan direction arrangements of large dot nozzles and small dot nozzles staggered.

Further, the printing apparatus of this embodiment performs a multipass printing, so an area of the print medium that can be printed by a single printing scan is progressively formed with an image by the print head 5004 executing a plurality of printing scans. At this time, a conveying operation of the print medium for a distance smaller than the width d of the print head 5004 may be executed between the successive printing scans in order to further reduce undesired density unevenness and stripes caused by characteristic variations of individual nozzles.

<Relation Between Dot Overlap Rate Control and, Density Unevenness and Graininess>

Figure 9A:
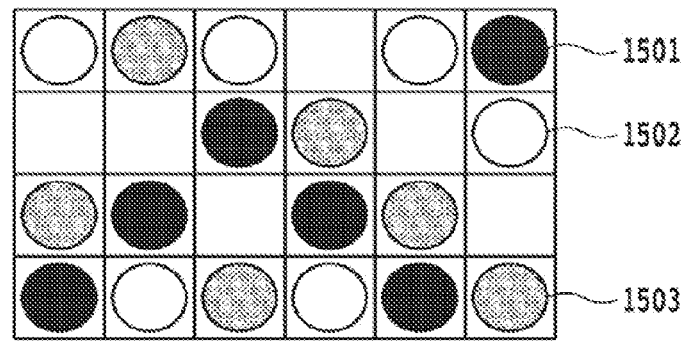
FIGS. 9A-9C show scattered states of dots.
Figure 9B:
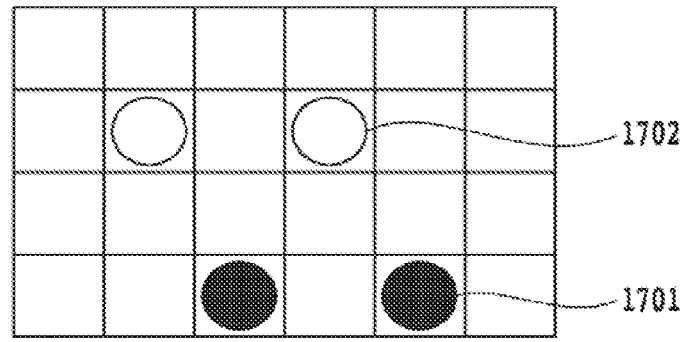
Figure 9C:
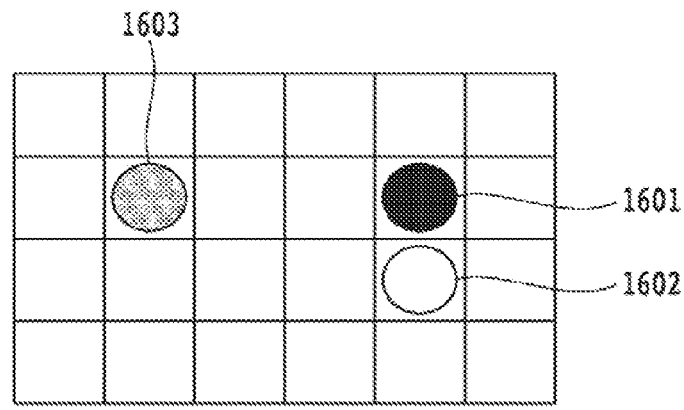

As described in the Related Art, when dots formed by different scans or different printing element groups shift and overlap, the density of the printed image varies from one location to another. This is perceived as density unevenness. To deal with this problem, this invention prepares beforehand a certain number of dots that are to be printed overlappingly at the same positions (same pixels or same subpixels) and makes an arrangement which, when printing position shifts occur, increases blank areas by making originally adjoining dots overlap each other and at the same time reduces blank areas by making originally overlapping dots separate from each other. This offsets an increase and a decrease in blank area, i.e., offsets a density increase with a density decrease, both caused by the print position shifts, which in turn is expected to minimize density variations in the entire image. It is noted, however, that preparing the overlapping dots in advance can degrade graininess, as explained with reference to FIG. 9C. That is, in the process of adjusting the number of overlapping dots that are prepared beforehand, it can be said that the density unevenness and the graininess have a tradeoff relationship.

However, as to the density variations and also the graininess and insufficient density, there is some allowable range (in which these anomalies are hardly recognizable because of the characteristic of human vision). It is therefore expected that if the dot overlap rate is adjusted to an extent that brings both of the anomalies within the allowable range, image impairments in the formed image can be made hardly noticeable. The allowable range, however, changes depending on a variety of conditions, such as the kind of ink used, the kind of print medium and density data value, and an appropriate dot overlap rate does not necessarily remain the same at all times. Particularly when the printing is done using a plurality of dot sizes—large dots and small dots—the appropriate dot overlap rate changes according to the dot size. It is therefore desired that a provision be made to make the dot overlap rate controllable according to dot size.

The "dot overlap rate" is explained here. The "dot overlap rate", as shown in FIGS. 4A to 4G and FIG. 16, is a percentage of those dots that are to be overlappingly printed in the same pixels by different scans or by different printing element groups (overlapping dots) with respect to a total number of dots that are printed in a unit area composed of T pixels (T is an integer equal to or greater than 1). The "same pixels" refer to the same pixel positions in the case of FIGS. 4A to 4G and the same subpixel positions in the case of FIG. 16.

An explanation will be given about the dot overlap rate involving a first plane and a second plane, each corresponding to a unit area defined by 4 pixels (in main scan direction) by 3 pixels (in subscan direction), with reference to FIGS. 4A to 4H. The "first plane" represents a set of binary data corresponding to a first scan or a first nozzle group; and the "second plane" represents a set of binary data corresponding to a second scan or a second nozzle group. "1" represents data instructing to print a dot and "0" represents data instructing not to print a dot.

In FIGS. 4A-4E the number of "1s" in the first plane is "4" and that in the second plane is also "4", so the total number of dots to be printed in a unit area composed of 4 pixels×3 pixels is "8". The number of "1s" in the first and the second plane at the same pixel positions represents the number of dots to be printed overlappingly in these same pixels (the number of overlapping dots). FIG. 4A has the number of overlapping dots of "0", FIG. 4B "2", FIG. 4C "4", FIG. 4D "6" and FIG. 4E "8". Therefore, the dot overlap rates in FIGS. 4A-4E are 0%, 25%, 50%, 75% and 100% as shown in FIG. 4H. Further, FIG. 4F represents a case of the dot overlap rate of 86% with the number of dots printed in the first plane being "4", that of the second plane being "3", the total dot number being "7" and the number of overlapping dots being "6". FIG. 4G represents a case of the dot overlap rate of 33% with the number of dots printed in the first plane being "4", that of the second plane being "2", the total dot number being "6" and the number of overlapping dots being "2". As shown above, the "dot overlap rate" is a percentage of overlapping dot data obtained by virtually stacking the two sets of dot data one upon the other, which are to be printed by different scans or different printing element groups.

The image processing method to control the dot overlap rate according to this invention will be detailed in the following by referring to some embodiments.

(First Embodiment)

Figure 3:
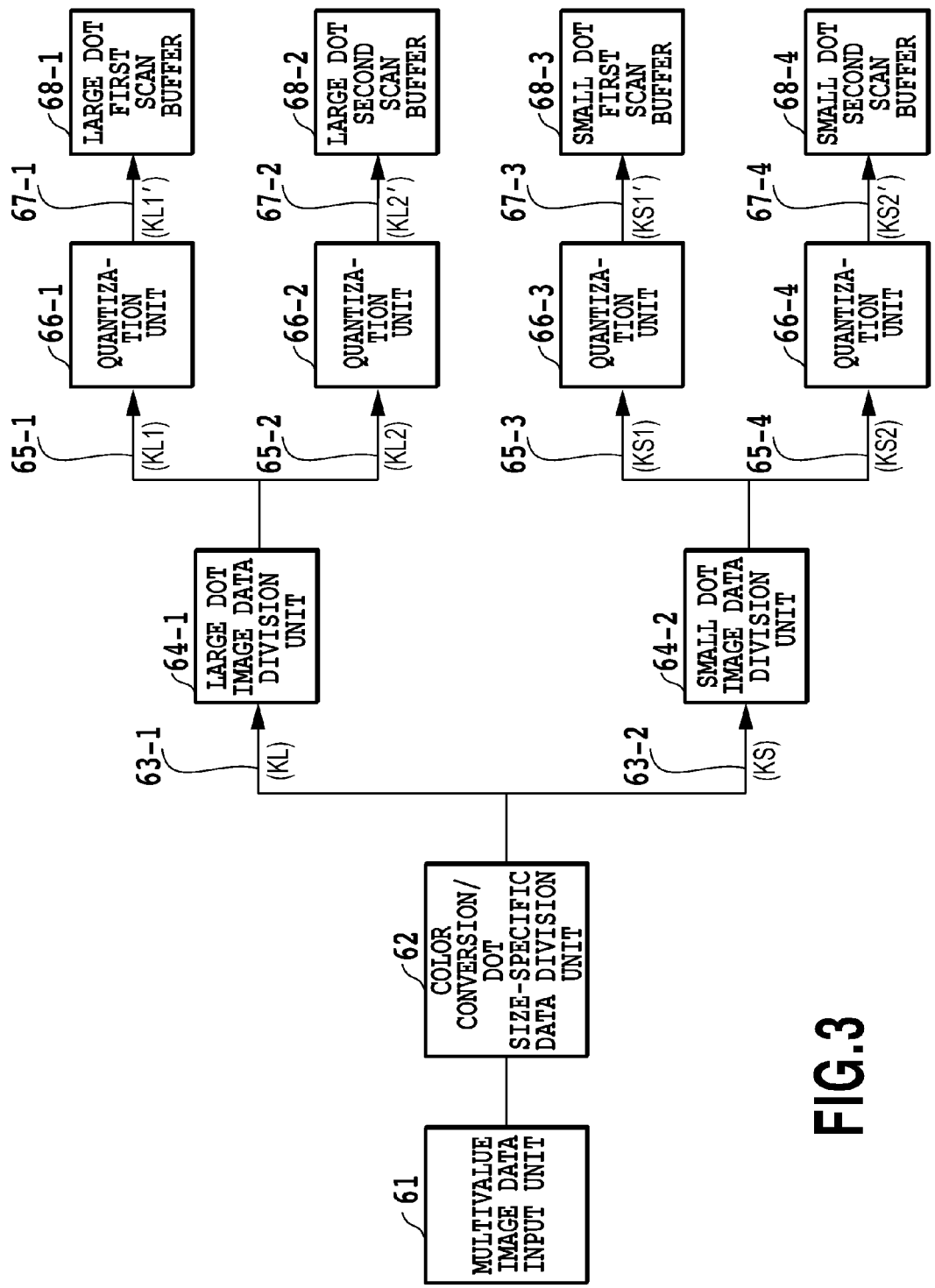
FIG. 3 is a block diagram to explain image processing in a first embodiment.

FIG. 3 is a block diagram showing the image processing when a 2-pass printing is performed to complete an image in an area of interest on a print medium by two printing scans. In this embodiment, a multivalue image data input unit 61, a color conversion/dot size-specific data distribution unit 62, image data division units 64-1, 64-2 and quantization units 66-1 to 66-4 are all provided in the control unit 3000.

The multivalue image data input unit 61 receives multivalue (256-value) RGB image data from an external device. The input image data (multivalue RGB data) is converted, for each pixel and for each of the four ink colors (CMYK), by the color conversion/dot size-specific data distribution unit 62 into two sets of multivalue image data (multivalue density data), one for large dots and one for small dots. The color conversion/dot size-specific data distribution unit 62 has a three-dimensional lookup table (LUT) that provides a one-to-one match between the RGB values, the large dot CMYK values (CL, ML, YL, KL) and the small dot CMYK values (CS, MS, YS, KS). By using this LUT, the RGB data can be converted en masse into the dot size-specific multivalue data—the large dot multivalue data (CL, ML, YL, KL) and the small dot multivalue data (CS, MS, YS, KS). For those input values deviating from lattice points on the table, an output value may be calculated by interpolating output values of neighboring lattice points.

Figure 17:
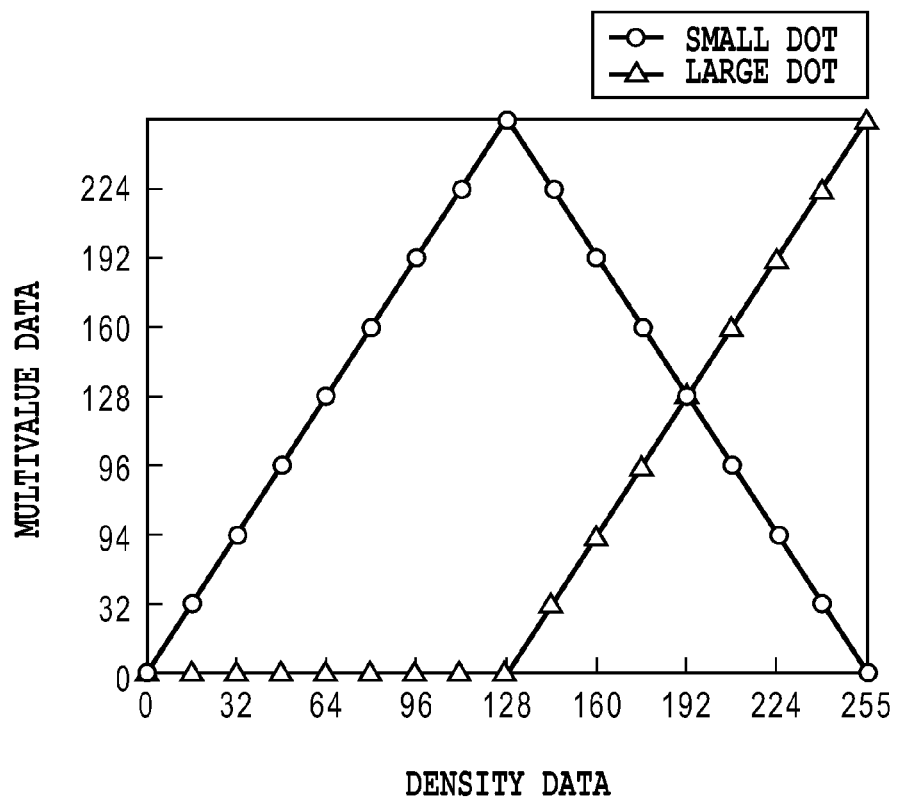
FIG. 17 is a graph showing how multivalue density data are generated for large dots and small dots.

FIG. 17 shows how the two sets of multivalue data for large dots and small dots are generated. In the figure the abscissa represents density data of a given color assigned to one particular pixel which has a signal value ranging from 0 to 255. The ordinate represents multivalue data (data output from the color conversion/dot size-specific data distribution unit 62) allocated to large dots and small dots. As described above, the color conversion/dot size-specific data distribution unit 62 generates the large dot multivalue density data (CL, ML, YL, KL) and the small dot multivalue density data (CS, MS, YS, KS), based on the input image data (density data) for the associated pixels.

Generally, printing apparatus using large dots and small dots often distributes multivalue data according to a pattern shown in FIG. 17. With such a distribution, graininess feared to emerge in low grayscale regions can be minimized by using small dots. In high density regions the maximum density can be enhanced by using large dots.

It is noted, however, that the input image data actually entered into the color conversion/dot size-specific data distribution unit 62 of this embodiment is not the density data (CMYK) for each pixel represented by the abscissa of FIG. 17 but the brightness data (RGB) for each pixel. So, the LUT referenced by the color conversion/dot size-specific data distribution unit 62 of this embodiment is so constructed that the density data (abscissa) supposed from the RGB value and the multivalue data (ordinate) for large dots and small dots satisfy the relationship shown in FIG. 17. That is, a three-dimensional LUT is prepared that provides a one-to-one match between the input image data in RGB value, the large dot multivalue data (CL, ML, YL, KL) and the small dot multivalue data (CS, MS, YS, KS).

The process described below is executed parallelly and independently for the four CMYK colors. So, the following explanation will be given only to the process for black (K). The large dot multivalue data KL 63-1 and the small dot multivalue data KS 63-2, both generated by the color conversion/dot size-specific data distribution unit 62, are sent to a large dot image data division unit 64-1 and a small dot image data division unit 64-2, respectively. Then, the large dot multivalue data KL 63-1 is divided into large dot first scan multivalue data KL1 65-1 and large dot second scan multivalue data KL2 65-2 according to a predetermined distribution rate (conversion process). The small dot multivalue data KS 63-2 is also divided into small dot first scan multivalue data KS1 65-3 and small dot second scan multivalue data KS2 65-4 according to a small dot distribution rate different from the predetermined distribution rate (conversion process). As described above, this embodiment differentiates the distribution rate used for the dividing operation between the large dot image data division unit 64-1 and the small dot image data division unit 64-2 so as to differentiate the dot overlap rate between large dots and small dots. The conversion method and the working principle for differentiating the dot overlap rate between large dots and small dots will be detailed later.

The four pieces of multivalue data 65-1 to 65-4 generated by the large dot image data division unit 64-1 and the small dot image data division unit 64-2 are binarized by respective quantization units 66-1 to 66-4 (quantization operation). A quantization unit 66-1 binarizes (or quantizes) the large dot first scan multivalue data KL1 65-1 into large dot first scan binary data KL1' 67-1. A quantization unit 66-2 binarizes (or quantizes) the large dot second scan multivalue data KL2 65-2 into large dot second scan binary data KL2' 67-2. A quantization unit 66-3 binarizes (or quantizes) the small dot first scan multivalue data KS1 65-3 into small dot first scan binary data KS1' 67-3. A quantization unit 66-4 binarizes (or quantizes) the small dot second scan multivalue data KS2 65-4 into small dot second scan binary data KS2' 67-4. In this embodiment, the quantization method employed in these four quantization units 66-1 to 66-4 is a commonly used error diffusion method.

As for dots of the same size, it is desired that two error diffusion operations for the first and the second scan use different diffusion matrices in order to properly mingle pixels in which dots are formed in two scans with those in which dots are formed in only one scan. For example, the quantization unit 66-1 and the quantization unit 66-3 may use a diffusion matrix shown in FIG. 8A and the quantization unit 66-2 and the quantization unit 66-4 may use a diffusion matrix shown in FIG. 8B.

As a result of the above quantization, those pixels for which both of KL1' and KL2' are "1" are printed with two large dots overlappingly. In pixels for which both of KL1' and KL2' are "0", no large dot is printed. Pixels, for which either KL1' or KL2' is "1", are printed with only one large dot. This also applies to small dots.

The binary image data KL1', KL2', KS1', KS2' generated by the quantization units 66-1 to 66-4 are sent through IEEE 1284 bus 3022 to the printer engine 3004 shown in FIG. 3.

In the printer engine 3004, the large dot first scan binary data KL1' 67-1 is stored in the large dot first scan buffer 68-1 and then printed in the first scan by the associated large dot nozzles k1 or k2 of the nozzle array 54 or 55. The large dot second scan binary data KL2' 67-2 is stored in the large dot second scan buffer 68-2 and then printed in the second scan by the associated large dot nozzles k2 or k2 of the nozzle array 54 or 55. The small dot first scan binary data KS1' 67-3 is stored in the small dot first scan buffer 68-3 and then printed in the first scan by the associated small dot nozzles sk1 or sk2 of the nozzle array 54 or 55. Further, the small dot second scan binary data KS2' 67-4 is stored in the small dot second scan buffer 68-4 and then printed in the second scan by the associated small dot nozzles sk1 or sk2 of the nozzle array 54 or 55.

A method of controlling the dot overlap rate characteristic of this embodiment will be explained in the following. Table 1 shows distribution rates at which the image data division unit (64-1 or 64-2) of this embodiment divides multivalue data between the first and the second scan, and dot overlap rates between the first and the second scan when the commonly used error diffusion operation is performed on the divided pieces of multivalue data.

In Table 1, the printing rate (%) refers to the number of ink dots of one color printed in the unit area. When no dot is printed in the unit area, the printing rate is 0%; and when the maximum number of dots is printed in the unit area, the printing rate is 100%. So, a printing rate of 60%, for example, means that the number of dots (153) equivalent to 60% of the maximum value (255) of the large dot multivalue data 63-1 or small dot multivalue data 63-2 is printed in the unit area. Table 1 shows such a dot overlap rate of 0-100% in ten stages.

The distribution rate (%) refers to a percentage at which the multivalue data determined by the printing rate is distributed to a first scan and a second scan. The total of the distribution rates is 100%. When large dot multivalue data (KL=100) is divided into first scan multivalue data (KL1=80) and second scan multivalue data (KL2 20), for example, the distribution rate is KL1:KL2=80:20. Table 1 shows such a distribution rate in six stages. The table also shows dot overlap rates as related to the distribution rate and the printing rate, obtained after being subjected to the binarization by the commonly used error diffusion method.

TABLE 1

| Distribution rate (%) | | Printing rate (%) | | | | | | | | | |
|---|---|---|---|---|---|---|---|---|---|---|---|
| First scan | Second scan | 10 | 20 | 30 | 40 | 50 | 60 | 70 | 80 | 90 | 100 |
| 100 | 0 | 0 | 0 | 0 | 0 | 0 | 0 | 0 | 0 | 0 | 0 |
| 90 | 10 | 1.8 | 3.6 | 5.4 | 7.2 | 9 | 10.8 | 12.6 | 14.4 | 16.2 | 18 |
| 80 | 20 | 3.2 | 6.4 | 9.6 | 12.8 | 16 | 19.2 | 2.4 | 25.6 | 28.8 | 32 |
| 70 | 30 | 4.2 | 8.4 | 12.6 | 16.8 | 21 | 25.2 | 29.4 | 33.6 | 37.8 | 42 |
| 60 | 40 | 4.8 | 9.6 | 14.4 | 19.2 | 24 | 28.8 | 33.6 | 38.4 | 43.2 | 48 |
| 50 | 50 | 5 | 10 | 15 | 20 | 25 | 30 | 35 | 40 | 45 | 50 |

Figure 6:
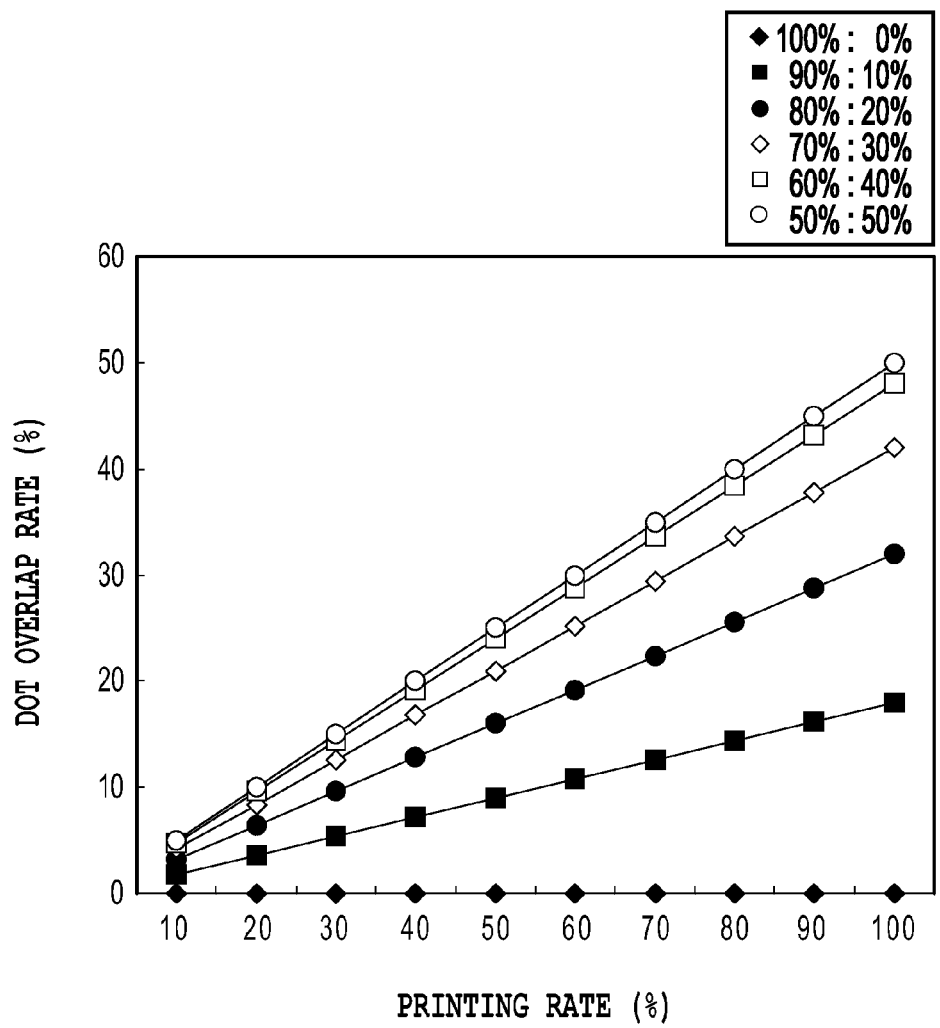
FIG. 6 is a diagram showing a relation between a distribution rate and a dot overlap rate in the embodiment of this invention.

FIG. 6 is a graph plotting the values of Table 1, with the abscissa representing a printing rate and the ordinate representing a dot overlap rate. For each of the six stages of distribution rate shown in Table 1, dot overlap rates for different printing rate are represented by a straight line with an inclination. For example, when the distribution rate for a first scan is 100% and that for a second scan is 0%, all multivalue data are printed by only the first printing scan. In that case, dots do not overlap and, if the printing rate increases, the dot overlap rate remains at 0%. As the distribution rate for the second printing scan is progressively increased, the dot overlap rate gradually rises with respect to the printing rate. Then, when the distribution rate is 50% each for the first and the second printing scan, the dot overlap rate has a maximum inclination with respect to the printing rate and, when the printing rate is 100%, becomes 50%. So, by acquiring the relationship between the distribution rate and the dot overlap rate, as shown in Table 1 and FIG. 6, in advance, a desired dot overlap rate can be realized by adjusting the distribution rate.

Referring to FIG. 17, in density regions where the paper surface is covered with relatively many dots, such as intermediate to high density regions, changes in the dot overlap rate tend to affect a dot coverage, making density unevenness easily noticeable. So, this embodiment sets the dot overlap rate of large dots, used more often in the intermediate to high density regions, at a relatively high level. In low density regions where dots are sparsely printed, the graininess caused by the dot overlapping is more noticeable than the density unevenness caused by changes in the dot overlapping state.

Therefore, the dot overlap rate of small dots, used more frequently in the low density regions, is set at a relatively low level. That is, this embodiment sets the dot overlap rate of large dots higher than that of small dots. To this end, the large dot image data division unit 64-1 and the small dot image data division unit 64-2 perform the data divisions according to the different distribution rates. More specifically, the difference of the distribution rate used in the large dot image data division unit 64-1 is set smaller than that of the distribution rate used in the small dot image data division unit 64-2. For example, referring again to FIG. 6, the setting of the distribution rate of large dots at 50%:50% and the distribution rate of small dots at 80%:20% can render the dot overlap rate of small dots and reduce the graininess for low density region wherein the printing rate of small dots is low and the density data indicated in FIG. 17 is lower than 100. In addition, that setting can keep the dot overlap rate of large dots higher than the dot overlap rate of small dots and reduce the density unevenness for high density region wherein the density data indicated in FIG. 17 is higher than 180 at that point the printing rate of large dots is 40%, the printing rate of small dots is 60%.

With the above arrangement, an image with both the density unevenness and the graininess reduced to be produced in an entire density range from low to high density regions.

It is noted, however, that this embodiment does not have to convert the multivalue brightness data (RGB) at one time into the large dot multivalue data and the small dot multivalue data by the color conversion/dot size-specific data distribution unit 62 using the three-dimensional LUT. The operations of color-converting the brightness data RGB into the density data CMYK and of converting the density data CMYK into a plurality of multivalue data for large dots and for small dots may be provided independently of each other.

Although the distribution rates of the first and the second scan are so determined that their sum is 100%, the sum of the distribution rates of the first and the second scan may be set greater or smaller than 100% for the convenience of image processing or for improved absolute density.

Figure 7:
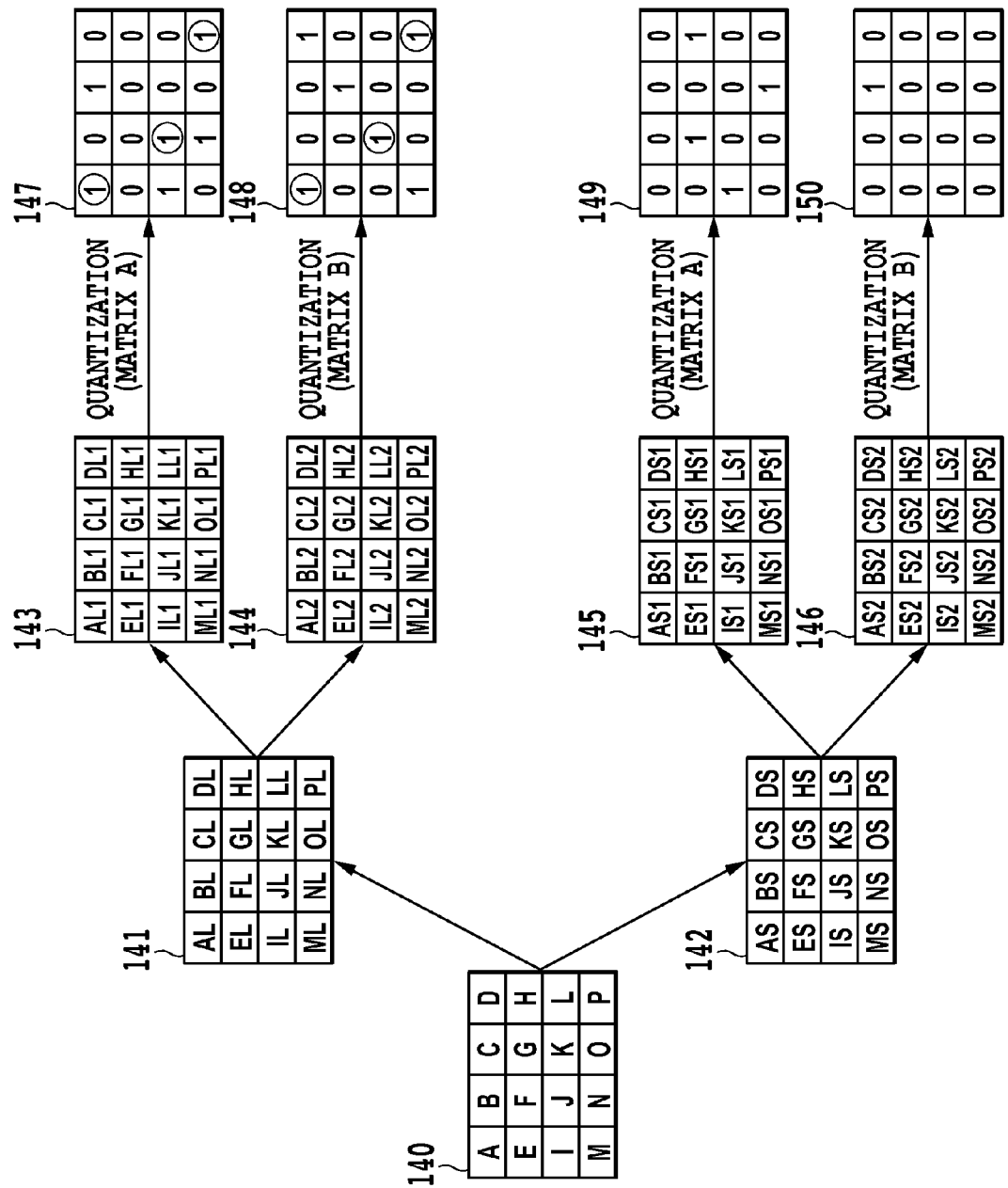
FIG. 7 is a diagram conceptually showing an example of image processing.

FIG. 7 is an imagery representing an example of the image processing shown in FIG. 3. Here the processing of input image data 140 corresponding to an area of 4×4 pixels or 16 pixels in total will be explained by keeping track of the process of FIG. 3. Symbols A to P represent a set of RGB values of input image data 140 in individual pixels. Symbols AL to PL represent a set of CMYK values of large dot multivalue data 141 in individual pixels. Symbols AS to PS represent a set of CMYK values of small dot multivalue data 142 in individual pixels. Symbols AL1 to PL1 represent a set of CMYK values of large dot first scan multivalue data 143 in individual pixels. Symbols AL2 to PL2 represent a set of CMYK values of large dot second scan multivalue data 144 in individual pixels. Further, symbols AS1 to PS1 represents a set of CMYK value of small dot first scan multivalue data 145 in individual pixels. Symbols AS2 to PS2 represent a set of CMYK values of small dot second scan multivalue data 146 in individual pixels.

In the figure, the large dot multivalue data 141 corresponds to the large dot multivalue data KL 63-1 in FIG. 3. The small dot multivalue data 142 corresponds to the small dot multivalue data KS 63-2. The large dot first scan multivalue data 143 corresponds to the large dot first scan multivalue data KL1 65-1. The large dot second scan multivalue data 144 corresponds to the large dot second scan multivalue data KL2 65-2. Further, large dot first scan quantized data 147 corresponds to the large dot first scan binary data KL1' 67-1. Large dot second scan quantized data 148 corresponds to the large dot second scan binary data KL2' 67-2. This also applies to small dots.

First, the input image data 140 (RGB data) is entered into the color conversion/dot size-specific data distribution unit 62. The color conversion/dot size-specific data distribution unit 62 then converts, for each pixel, the input image data 140 (RGB data) into the large dot multivalue data 141 (CMYK data) and small dot multivalue data 142 (CMYK data) through the three-dimensional LUT. The subsequent operations will be explained in only one color (K) for simplicity.

The large dot multivalue data 141 is entered into the large dot image data division unit 64-1, which, according to the distribution rate with little bias such as 50:50, converts the multivalue data for each pixel into the large dot first scan multivalue data 143 and the large dot second scan multivalue data 144. The small dot multivalue data 142 is entered into the small dot image data division unit 64-2, which, according to the distribution rate with a heavy bias such as 80:20, converts the multivalue data for each pixel into the small dot first scan multivalue data 145 and the small dot second scan multivalue data 146.

Then, the large dot first scan multivalue image data 143 is entered into the first quantization unit 66-1, which performs an error diffusion operation on the multivalue image data to produce the large dot first scan quantized data 147. The large dot second scan multivalue image data 144 is entered into the second quantization unit 66-2, which performs an error diffusion operation on the multivalue image data to produce the large dot second scan quantized data 148. Meanwhile, the small dot first scan multivalue image data 145 is entered into the third quantization unit 66-3, which performs an error diffusion operation on the multivalue image data to produce the small dot first scan quantized data 149. The small dot second scan multivalue image data 146 is entered into the fourth quantization unit 66-4, which performs an error diffusion operation on the multivalue image data to produce the small dot second scan quantized data 150. The quantization units 66-1 and 66-3 perform the error diffusion operation using the error diffusion matrix A shown in FIG. 8A and the quantization operations 66-2 and 66-4 perform the error diffusion operation using the error diffusion matrix B shown in FIG. 8B.

In FIG. 7, of the first and the second scan quantized data for large and small dots 147 to 150, the data "1" represents an instruction to print a dot (ejection of ink) and data "0" represents an instruction not to print a dot (non-ejection of ink). As for large dots that have been distributed according to a distribution rate with little bias such as 50:50, it is seen that there are nearly equal numbers of dot-printing "1s" in the first scan binary data 147 and in the second scan binary data 148. It is also seen that the number of large dots to be printed overlappingly in the same pixels (6 dots) is almost half the number of large dots to be printed (12 dots), i.e., the dot overlap rate is 50%. Meanwhile, as for small dots distributed according to a heavily biased distribution rate such as 80:20, it is seen that there is a large imbalance in the number of dot-printing "1s" between the first scan binary data 149 and the second scan binary data 150. The two sets of data have very few small dots to be overlappingly printed in the same pixels (in this example, 0 dot). That is, the dot overlap rate is close to 0%.

With this embodiment described above, to realize dot overlap rates suited for large dots and for small dots, a plurality of pieces of multivalue data for different scans are generated according to the distribution rates for large dots and small dots, and these multivalue data are binarized. This enables the dot overlap rate for large dots, which are likely to show density unevenness caused by density variations due to print position deviations more than other image impairments, to be set higher than the dot overlap rate for small dots, which are likely to show graininess more than the density variations due to print position shifts. That is, by differentiating the dot overlap rate between the large dots that tend to make density unevenness more noticeable than graininess and the small dots which tend to show graininess more than density unevenness, a satisfactory image can be produced in the entire density range.

(Second Embodiment)

When two different sizes of dots are used, image impairment problems cannot always be limited to the situation like the first embodiment in which the problem of graininess is likely to occur with small dots and the problem of density unevenness is likely to occur with large dots. Generally, in a density range where the surface of a print medium is just about fully covered with dots (dot coverage rate is close to 100%), the dot coverage rate becomes most sensitive to a shift between the two planes so that the print position shift in this density range affects the density unevenness the most. Which of the density data regions in FIG. 17 this density range corresponds to depends on a relation between printing resolution and dot diameter and can vary according to various conditions, such as the kind of ink and the kind of print medium used. So, in a system using large dots and small dots, the density unevenness or density variations are not always more conspicuous with large dots than with small dots. For example, let us consider a case where small dots are large enough for a pixel of printing resolution. In areas of surface of print medium where only small dots are used, if there are regions that are just fully covered with small dots, density variations due to shifts between the two planes may show most conspicuously in these regions.

This embodiment explains the method of controlling the dot overlap rate in the above situation. More specifically, referring to FIG. 17, since density variations due to shifts between the planes tend to show most conspicuously where the density data using only small dots is below 128, the dot overlap rate for small dots is set relatively high. Meanwhile, as to large dots used in high density areas that are fully covered with dots, because there are greater concerns for density insufficiency caused by exposure of blank areas due to overlapping dots than density variations due to shifts between the two planes, the dot overlap rate is set relatively low. That is, in this embodiment, the dot overlap rate for large dots is set lower than that for small dots, as sown in FIG. 18B.

In this embodiment, to realize such a relation in dot overlap rate between large dots and small dots, the bias of distribution rate used in the large dot image data division unit 64-1 of FIG. 3 is set greater than that used in the small dot image data division unit 64-2. For example, referring again to FIG. 6, the distribution rate for small dots is set at 50%:50% and the distribution rate for large dots at 80%:20%. This arrangement enables the dot overlap rate for large dots to be kept lower than that of small dots for density region up to a region wherein the printing rate of large dots is 40%, the printing rate of small dots is 60% and the density data indicated in FIG. 17 is approximately 180.

As described above, in this embodiment, too, to realize dot overlap rates suited for large dots and for small dots, a plurality of pieces of multivalue data are generated for different scans according to the distribution rates for large dots and for small dots, and these multivalue data are subjected to the binarization operation. This allows the dot overlap rate for small dots that are feared to produce density variations due to print position deviations to be set higher than the dot overlap rate for large dots that pose greater concerns for possible density insufficiency than for density variations due to print position deviations. That is, by differentiating the dot overlap rate between small dots that tend to make density variations conspicuous and large dots that tend to make density insufficiency more problematic than density variations, a good image can be produced in the entire density range.

(Third Embodiment)

In the first embodiment, explanations have been given to the method of adjusting the distribution rate used in the color conversion/dot size-specific data distribution unit in controlling the dot overlap rates for large dots and for small dots. In this embodiment, the dot overlap rates are controlled by offering provisions to the quantization operation performed to quantize a plurality of pieces of multivalue density data generated by the color conversion/dot size-specific data distribution unit. At this time, the dot overlap rates may be controlled by cooperating the color conversion/dot size-specific data distribution unit with the quantization unit.

Figure 12:
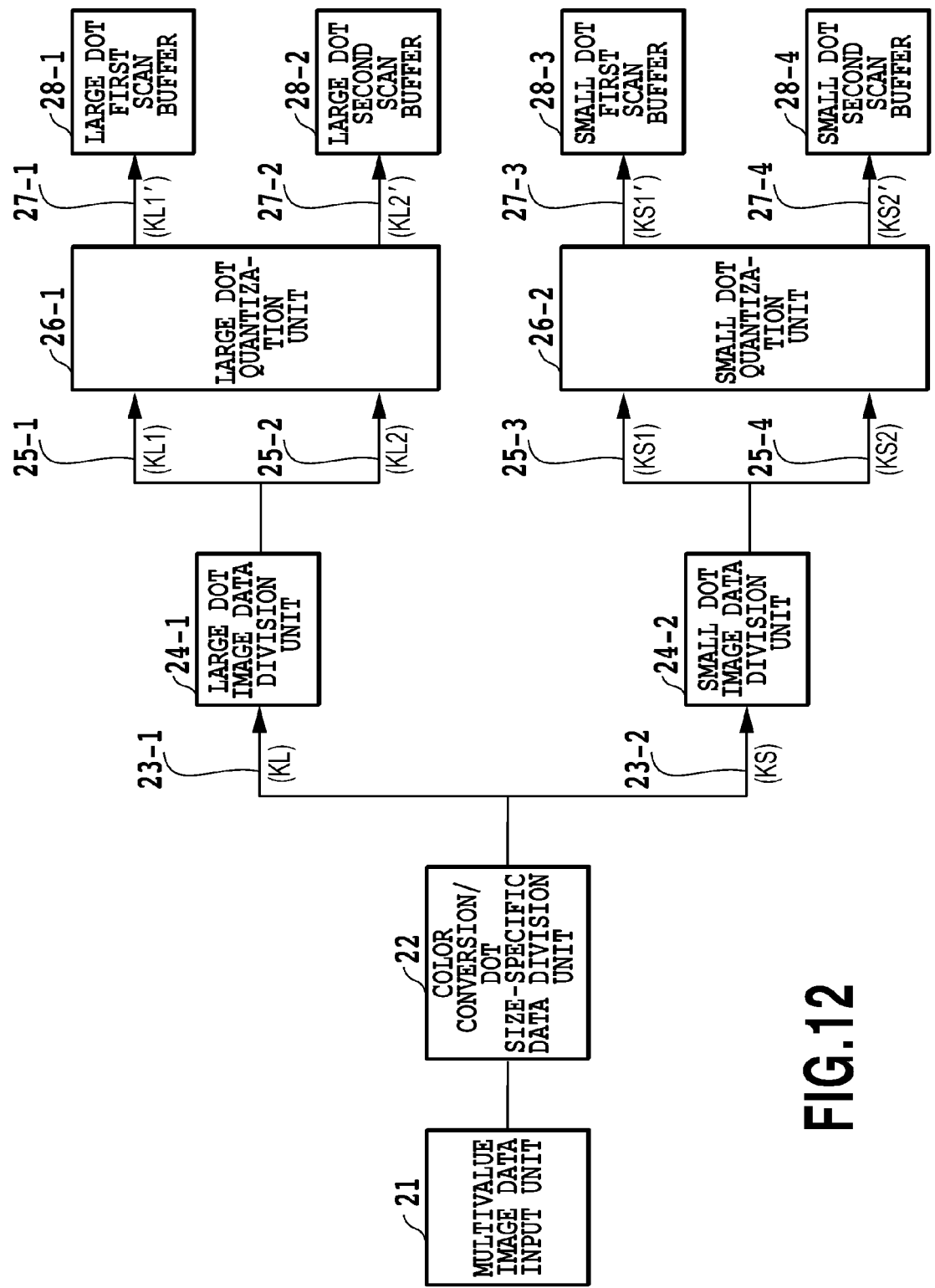
FIG. 12 is a block diagram showing image processing performed in a third embodiment.

FIG. 12 is a block diagram showing the image processing performed during a multipass printing that completes an image in the same area of a print medium by two printing scans. Here, the operations represented by blocks 21-26 are assumed to be executed on the input image data, entered from an image input device such as the digital camera 3012, by the control unit 3000 of FIG. 2.

Multivalue (256-value) RGB image data is entered from an external device into the multivalue image data input unit 21. The input image data (multivalue RGB data) is then converted en masse into large dot multivalue data (CL, ML, YL, KL) and small dot multivalue data (CS, MS, YS, KS) by the color conversion/dot size-specific data distribution unit 22. The construction of the color conversion/dot size-specific data distribution unit 22 is similar to that of the preceding embodiments. The subsequent operations are executed for four colors independently at the same time, so the following explanation will be given only for black (K).

The large dot multivalue data KL 23-1 and the small dot multivalue data KS 23-2, both generated by the color conversion/dot size-specific data distribution unit 22, are sent to a large dot image data division unit 24-1 and a small dot image data division unit 24-2, respectively. Then, the large dot multivalue data KL 23-1 is divided into large dot first scan multivalue data KL1 25-1 and large dot second scan multivalue data KL2 25-2 (conversion operation). The small dot multivalue data KS 23-2 is divided into small dot first scan multivalue data KS1 25-3 and small dot second scan multivalue data KS2 25-4 (conversion operation). In this embodiment, the distribution rates used in the large dot image data division unit 24-1 and the small dot image data division unit 24-2 are both 50:50. It is also noted, however, that, as in the preceding embodiments, the method of adjusting the distribution rate to control the dot overlap rate may be additionally employed at the same time so that the data for large dots and for small dots can be divided at different distribution rates.

A large dot quantization unit 26-1 binarizes (or quantizes) the large dot first scan multivalue data KL1 25-1 and the large dot second scan multivalue data KL2 25-2. That is, these data are converted (or quantizes) into either "0" or "1" to produce large dot first scan binary data KL1' 27-1 and large dot second scan binary data KL2' 27-2, respectively. At this time, pixels for which both of KL1' and KL2' are "1" are printed with two large dots overlappingly. Pixels, for which both of KL1' and KL2' are "0", are printed with no large dots. Pixels, for which either KL1' or KL2' is "1", are printed with only one large dot. The same is also true of a small dot quantization unit 26-2. In this embodiment, the quantization method is differentiated between the large dot quantization unit 26-1 and the small dot quantization unit 26-2 to differentiate the dot overlap rate between large dots and small dots. The quantization process in this embodiment will be explained as follows.

The process executed in the large dot quantization unit 26-1 or the small dot quantization unit 26-2 will be described by referring to the flow chart of FIG. 10. In the flow chart, two pieces of input multivalue data K1 and K2, the subjects to be quantized, have a value of between 0 and 255, whether they are for large dots or small dots. That is, K1 and K2, if they are for large dots, correspond to KL1 and KL2 described above and, if they are for small dots, to KS1 and KS2 described above. K1err and K2err refer to accumulated error values produced from surrounding pixels that have already undergone the quantization operation. K1ttl and K2ttl are sum values of the input multivalue data and the accumulated error values. K1' and K2' in the flow chart refer to binarized data for the first printing scan and the second printing scan and, if they are for large dots, correspond to KL1' and KL2' described above and, if they are for small dots, to KS1' and KS2' described above.

In this process, thresholds (quantization parameters) used to determine the values of binarized data K1' and K2' are set to vary depending on the values of K1ttl and K2ttl. So, a table is prepared beforehand which determines a unique threshold according to the value of K1ttl or K2ttl. Here, let a threshold to be compared with K1ttl in determining K1' be K1table[K2ttl] and a threshold to be compared with K2ttl in determining K2' be K2table[K1ttl]. K1table[K2ttl] is a value determined by the value of K2ttl, and K2table[K1ttl] is a value determined by the value of K1ttl.

At the start of this process, step S21 calculates K1ttl and K2ttl. Next, step S22 refers to a threshold table shown below in Table 2 and acquires two thresholds K1table[K2ttl] and K2table[K1ttl] by using K1ttl and K2ttl determined by step S21. The threshold K1table[K2ttl] is uniquely determined by using K2ttl as a "reference value" in the threshold table of Table 2. The threshold K2table[K1ttl] is uniquely determined by using K1ttl as a "reference value" in the threshold table of Table 2.

Subsequent steps S23-S25 determine the value of K1' and steps S26-S28 determine the value of K2'. More specifically, step S23 checks if K1ttl calculated by step S21 is equal to or greater than the threshold K1table[K2ttl] acquired by step S22. If K1ttl is found to be equal to or greater than the threshold, K1'=1. Based on this output value (K1'=1), the accumulated error value K1err (=K1ttl−255) is calculated and updated (step S25). If K1ttl is found to be less than the threshold, K1' is determined to be K1'=0. Based on this output value (K1'=0), the accumulated error value K1err (=K1ttl) is calculated and updated (step S24).

Next, step S26 checks if K2ttl calculated by step S21 is equal to or greater than the threshold K2table[K1ttl] acquired by step S22. If K2ttl is found to be equal to or greater than the threshold, K2'=1. Based on this output value (K2'=1), the accumulated error value K2err (=K2*ttl*−255) is calculated and updated (step S28). If K2*ttl* is found to be less than the threshold, K2' is determined to be K2'=0. Based on this output value (K2'=0), the accumulated error value K2err (=K2*ttl*) is calculated and updated (step S27).

Then, according to the error diffusion matrices shown in FIG. 8A and FIG. 8B, step S29 spreads the updated accumulated error values K1err and K2err to those surrounding pixels that have yet to be quantized. In this embodiment, the error diffusion matrix of FIG. 8A is used to spread the accumulated error value K1err to the surrounding pixels; and, to spread the accumulated error value K2err to the surrounding pixels, the error diffusion matrix of FIG. 8B is used.

In this embodiment, the threshold (quantization parameter) used to quantize the first multivalue data (K1*ttl*) for the first scan is determined based on the second multivalue data (K2*ttl*) for the second scan. Similarly, the threshold (quantization parameter) used to quantize the second multivalue data (K2*ttl*) for the second scan is determined based on the first multivalue data (k1*ttl*) for the first scan. That is, the quantization operations on the multivalue data that corresponds to one scan of the two scans and the quantization processing of multi-value data that corresponds to the other scan of the two scans are performed based on both the multivalue data that corresponds to the one scan and the multivalue data that corresponds to the other scan. This makes it possible to minimize the possibility of the pixels printed with a dot of one size in one of the two scans being printed with a dot of the same size in the other scan, or conversely to positively increase that possibility. As a result, density unevenness can be minimized by striking an appropriate balance between it and graininess degradation and density insufficiency.

Figure 10:
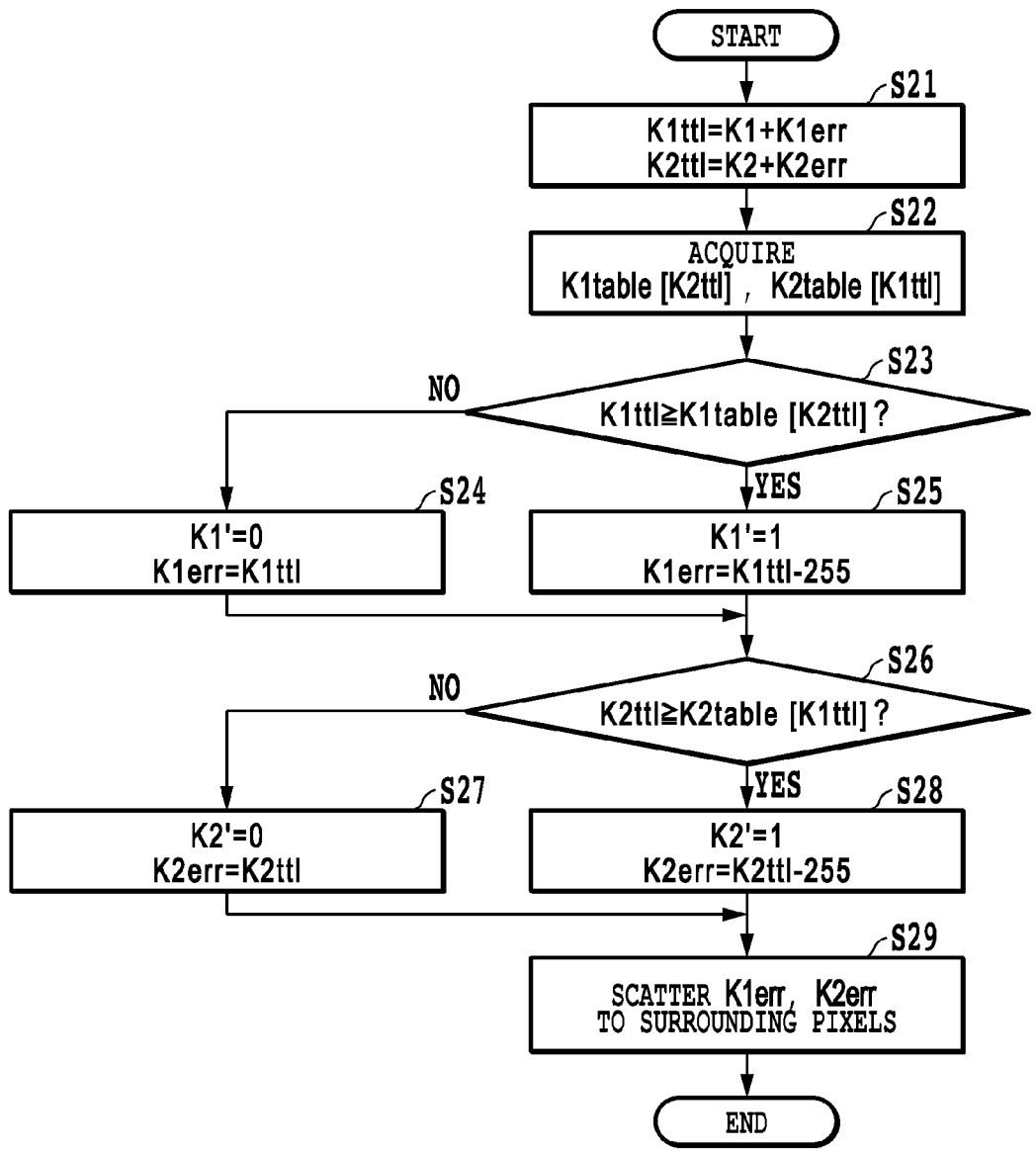
FIG. 10 is a flow chart showing a process of quantization.
Figure 13A:
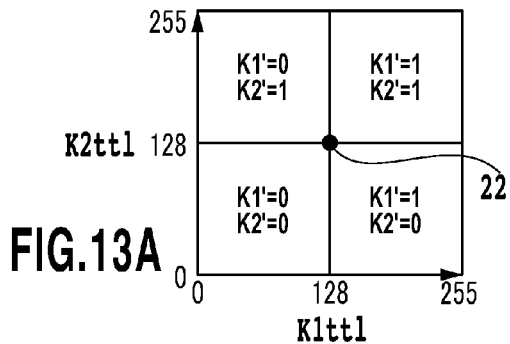
FIGS. 13A-13G are diagrams showing a relation between an input value and the result of quantization process.

FIG. 13A shows the result of performing the quantization operation (binarization operation) using the thresholds in a "FIG. 13A" column in the threshold table of Table 2 according to the flow chart of FIG. 10, as related to input values (K1*ttl* and K2*ttl*). K1*ttl* and k2*ttl* both can take a value between 0 and 255, to be printed (1) or not to be printed (0) is determined with a threshold of 128 as a boundary, as shown in the "FIG. 13A" column in the threshold table. A point 221 in the figure represents a boundary point between an area where no dot is to be printed (K1'=0 and K2'=0) and an area where two dots overlap (K1'=1 and K2'=1).

Figure 13B:
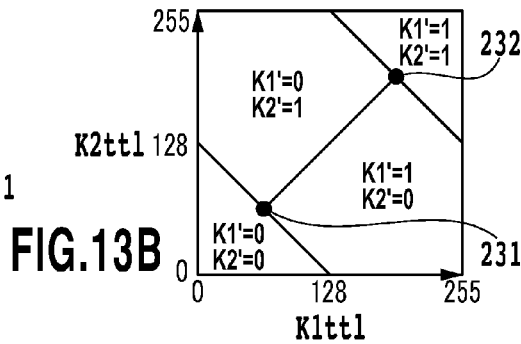

FIG. 13B shows the result of the quantization operation (binarization operation) executed by using thresholds in a "FIG. 13B" column in the threshold table of Table 2 according to the flow chart of FIG. 10, as related to input values (K1*ttl* and K2*ttl*). A point 231 in the figure represents a boundary point between an area where no dot is to be printed (K1'=0 and K2'=0) and an area where only one dot is formed (K1'=1 and K2'=0, or K1'=0 and K2'=1). A point 232 is a boundary between an area where two dots are overlappingly printed (K1'=1 and K2'=1) and an area where only one dot is formed (K1'=1 and K2'=0, or K1'=0 and K2'=1). Since the points 231 and 232 are spaced some distance apart, the area where only one dot is printed increases while the area where both dots are formed decreases, when compared with the arrangement of FIG. 13A. That is, the arrangement of FIG. 13B renders the dot overlap rate lower than that of FIG. 13A and is therefore advantageous in minimizing graininess. If there is a point at which the dot overlap rate changes sharply as in FIG. 13A, density unevenness can result even when the gradation changes only slightly. In the arrangement of FIG. 13B, however, the dot overlap rate changes smoothly with the gradation, so density unevenness hardly occurs.

As described above, the threshold used in the quantization operation affects the dot overlap rate after printing. Thus, by differentiating the threshold between large dots and small dots, the dot overlap rate can be adjusted according to the dot size. For example, the quantization operation shown in FIG. 13B may be employed in the small dot quantization operation 26-2 to keep graininess low in low-density regions where small dots are predominantly formed. Further, the quantization operation shown in FIG. 13E may be employed in the large dot quantization operation 26-1 to restrain density variations in intermediate-to-high density regions. Conversely, by adopting the quantization operation of FIG. 13B in the large dot quantization operation 26-1, insufficient density can be avoided in high density regions where large dots are predominantly used. Further, adopting the quantization operation of FIG. 13E in the small dot quantization operation 26-2 can keep density variations low in intermediate-to-high density regions.

Some example thresholds used to realize different dot overlap rates will be explained by referring to FIGS. 13C through FIG. 13G. In this embodiment, a quantization operation that can produce an optimal dot overlap rate need only be selected for the large dot quantization operation 26-1 and for the small dot quantization operation 26-2. FIGS. 13C-13G show the results of the quantization (K1' and K2') using the thresholds listed in the threshold table of Table 2, as related to the input values (K1*ttl* and K2*ttl*), as in FIG. 13A and FIG. 13B.

Figure 13C:
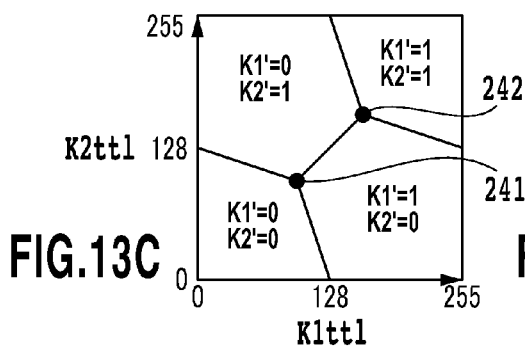

FIG. 13C shows an arrangement that puts the dot overlap rate at an intermediate value between FIG. 13A and FIG. 13B. A point 241 is placed at an intermediate point between the pint 221 of FIG. 13A and the point 231 of FIG. 13B. A point 242 is set at an intermediate point between the point 221 of FIG. 13A and the point 232 of FIG. 13B.

Figure 13D:
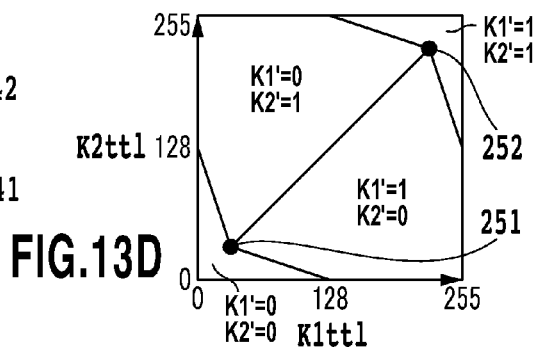

FIG. 13D shows an arrangement that reduces the dot overlap rate more than FIG. 13B does. A point 251 is set at a position that externally divides the distance between the point 221 of FIG. 13A and the point 231 of FIG. 13B at an external ratio of 3:2. A point 252 is set at an externally dividing point that externally divides the distance between the point 221 of FIG. 13A and the point 232 of FIG. 13B at an external ratio of 3:2.

Figure 13E:
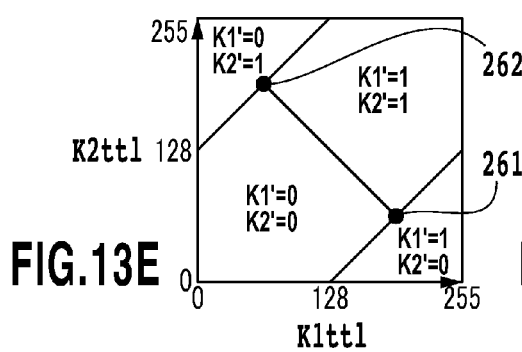
Figure 13F:
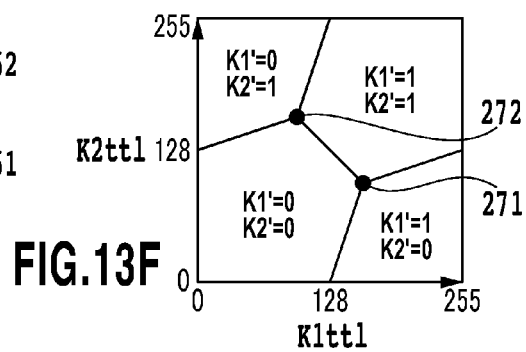
Figure 13G:
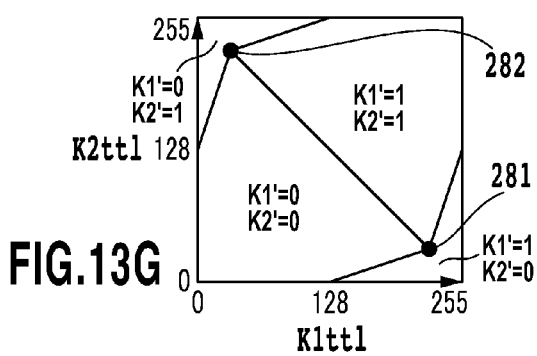

FIG. 13E shows an arrangement that renders the dot overlap rate higher than that of FIG. 13A. The arrangement of FIG. 13E makes more likely the transition from regions where no dot is printed (K1'=0 and K2'=0) to regions where two dots are overlappingly printed (K1'=1 and K2'=1), increasing the dot overlap rate. FIG. 13F shows an arrangement that puts the dot overlap rate at a value between FIG. 13A and FIG. 13E. FIG. 13G shows an arrangement that renders the dot overlap rate even higher than that of FIG. 13E.

Next, the method of quantization operation using the thresholds shown in Table 2 will be explained in detail. Table 2 is a threshold table from which step S22 in the flow chart of FIG. 10 acquires an appropriate threshold to realize the results of processing shown in FIGS. 13A-13G.

Here an example case will be taken up which has input values (K1*ttl*, K2*ttl*) of (100, 120) and uses thresholds listed in a "FIG. 13B" column of the threshold table. First, step S22 in FIG. 10 determines a threshold K1table[K2*ttl*] based on the threshold table (Table 2) and K2*ttl* (reference value). If the reference value (K2*ttl*) is "120", K1table[K2*ttl*] is "120". Similarly, a threshold K2table[K1*ttl*] is determined based on the threshold table and K1*ttl* (reference value). If the reference value (K1*ttl*) is "100", threshold K2table[K1*ttl*] is "101". Next, step S23 in FIG. 10 compares K1*ttl* and the threshold K1table[K2*ttl*]. Since K1*ttl* (=100)<threshold K1table[K2*ttl*] (=120), K1'=0 (step S24). Similarly, step S26 in FIG. 10 compares K2*ttl* and the threshold K2table[K1*ttl*]. Since K2*ttl* (=120)≥threshold K2table[K1*ttl*] (=101), K2'=1

(step S28). As a result, if (K1*ttl*, K2*ttl*)=(100, 120), then (K1', K2')=(0, 1), as shown in FIG. 13B.

According to the quantization operation as described above, the dot overlap rate is controlled between two scans by quantizing the multivalue data that correspond to the two scans based on both of the multi-value data corresponding to the two scans. This allows the dot overlap rate between the dots printed by one of the two scans and the dots printed by the other scan to be kept within an appropriate range according to the dot size. With this arrangement, it is possible to minimize the level of graininess in low density regions where small dots are predominantly used, and at the same time to minimize density unevenness in intermediate-to-high density regions where large dots are predominantly used. It is also possible to restrain density unevenness in low-to-intermediate density regions where small dots are predominantly used, and at the same time to avoid density insufficiency in high density regions where large dots are predominantly used. That is, by adjusting the dot overlap rate according to dot size, a satisfactory image with little noticeable impairments can be produced in the entire grayscale range from a low density region to a high density region. Although Table 2 shows every fourth reference value, the actual table provides thresholds (e.g., 1-3 thresholds) between these discrete reference values. It is also possible to have a table like Table 2, in which only discontinued or separate reference values are presented, and to obtain a threshold for any reference value between the presented ones by interpolating the thresholds of the nearest reference values.

TABLE 2

| | FIG. 13A | | FIG. 13B | | FIG. 13C | | FIG. 13D | | FIG. 13E | | FIG. 13F | | FIG. 13G | |
|---|---|---|---|---|---|---|---|---|---|---|---|---|---|---|
| ref. | K1 table | K2 table | K1 table | K2 table | K1 table | K2 table | K1 table | K2 table | K1 table | K2 table | K1 table | K2 table | K1 table | K2 table |
| 0 | 128 | 128 | 128 | 128 | 128 | 128 | 128 | 128 | 127 | 127 | 127 | 127 | 127 | 127 |
| 4 | 128 | 128 | 124 | 124 | 126 | 126 | 116 | 116 | 131 | 131 | 129 | 129 | 139 | 139 |
| 8 | 128 | 128 | 120 | 120 | 125 | 125 | 104 | 104 | 135 | 135 | 130 | 130 | 151 | 151 |
| 12 | 128 | 128 | 116 | 116 | 124 | 124 | 92 | 92 | 139 | 139 | 131 | 131 | 163 | 163 |
| 16 | 128 | 128 | 112 | 112 | 122 | 122 | 80 | 80 | 143 | 143 | 133 | 133 | 175 | 175 |
| 20 | 128 | 128 | 108 | 108 | 121 | 121 | 68 | 68 | 147 | 147 | 134 | 134 | 187 | 187 |
| 24 | 128 | 128 | 104 | 104 | 120 | 120 | 56 | 56 | 151 | 151 | 135 | 135 | 199 | 199 |
| 28 | 128 | 128 | 100 | 100 | 118 | 118 | 44 | 44 | 155 | 155 | 137 | 137 | 211 | 211 |
| 32 | 128 | 128 | 96 | 96 | 117 | 117 | 32 | 33 | 159 | 159 | 138 | 138 | 223 | 222 |
| 36 | 128 | 128 | 92 | 92 | 116 | 116 | 36 | 37 | 163 | 163 | 139 | 139 | 219 | 218 |
| 40 | 128 | 128 | 88 | 88 | 114 | 114 | 40 | 41 | 167 | 167 | 141 | 141 | 215 | 214 |
| 44 | 128 | 128 | 84 | 84 | 113 | 113 | 44 | 45 | 171 | 171 | 142 | 142 | 211 | 210 |
| 48 | 128 | 128 | 80 | 80 | 112 | 112 | 48 | 49 | 175 | 175 | 143 | 143 | 207 | 206 |
| 52 | 128 | 128 | 76 | 76 | 110 | 110 | 52 | 53 | 179 | 179 | 145 | 145 | 203 | 202 |
| 56 | 128 | 128 | 72 | 72 | 109 | 109 | 56 | 57 | 183 | 183 | 146 | 146 | 199 | 198 |
| 60 | 128 | 128 | 68 | 68 | 108 | 108 | 60 | 61 | 187 | 187 | 147 | 147 | 195 | 194 |
| 64 | 128 | 128 | 64 | 65 | 106 | 106 | 64 | 65 | 191 | 190 | 149 | 149 | 191 | 190 |
| 68 | 128 | 128 | 68 | 69 | 105 | 105 | 68 | 69 | 187 | 186 | 150 | 150 | 187 | 186 |
| 72 | 128 | 128 | 72 | 73 | 104 | 104 | 72 | 73 | 183 | 182 | 151 | 151 | 183 | 182 |
| 76 | 128 | 128 | 76 | 77 | 102 | 102 | 76 | 77 | 179 | 178 | 153 | 153 | 179 | 178 |
| 80 | 128 | 128 | 80 | 81 | 101 | 101 | 80 | 81 | 175 | 174 | 154 | 154 | 175 | 174 |
| 84 | 128 | 128 | 84 | 85 | 100 | 100 | 84 | 85 | 171 | 170 | 155 | 155 | 171 | 170 |
| 88 | 128 | 128 | 88 | 89 | 98 | 98 | 88 | 89 | 167 | 166 | 157 | 157 | 167 | 166 |
| 92 | 128 | 128 | 92 | 93 | 97 | 97 | 92 | 93 | 163 | 162 | 158 | 158 | 163 | 162 |
| 96 | 128 | 128 | 96 | 97 | 96 | 97 | 96 | 97 | 159 | 158 | 159 | 158 | 159 | 158 |
| 100 | 128 | 128 | 100 | 101 | 100 | 101 | 100 | 101 | 155 | 154 | 155 | 154 | 155 | 154 |
| 104 | 128 | 128 | 104 | 105 | 104 | 105 | 104 | 105 | 151 | 150 | 151 | 150 | 151 | 150 |
| 108 | 128 | 128 | 108 | 109 | 108 | 109 | 108 | 109 | 147 | 146 | 147 | 146 | 147 | 146 |
| 112 | 128 | 128 | 112 | 113 | 112 | 113 | 112 | 113 | 143 | 142 | 143 | 142 | 143 | 142 |
| 116 | 128 | 128 | 116 | 117 | 116 | 117 | 116 | 117 | 139 | 138 | 139 | 138 | 139 | 138 |
| 120 | 128 | 128 | 120 | 121 | 120 | 121 | 120 | 121 | 135 | 134 | 135 | 134 | 135 | 134 |
| 124 | 128 | 128 | 124 | 125 | 124 | 125 | 124 | 125 | 131 | 130 | 131 | 130 | 131 | 130 |
| 128 | 128 | 128 | 128 | 129 | 128 | 129 | 128 | 129 | 127 | 126 | 127 | 126 | 127 | 126 |
| 132 | 128 | 128 | 132 | 133 | 132 | 133 | 132 | 133 | 123 | 122 | 123 | 122 | 123 | 122 |
| 136 | 128 | 128 | 136 | 137 | 136 | 137 | 136 | 137 | 119 | 118 | 119 | 118 | 119 | 118 |
| 140 | 128 | 128 | 140 | 141 | 140 | 141 | 140 | 141 | 115 | 114 | 115 | 114 | 115 | 114 |
| 144 | 128 | 128 | 144 | 145 | 144 | 145 | 144 | 145 | 111 | 110 | 111 | 110 | 111 | 110 |
| 148 | 128 | 128 | 148 | 149 | 148 | 149 | 148 | 149 | 107 | 106 | 107 | 106 | 107 | 106 |
| 152 | 128 | 128 | 152 | 153 | 152 | 153 | 152 | 153 | 103 | 102 | 103 | 102 | 103 | 102 |
| 156 | 128 | 128 | 156 | 157 | 156 | 157 | 156 | 157 | 99 | 98 | 99 | 98 | 99 | 98 |
| 160 | 128 | 128 | 160 | 161 | 157 | 158 | 160 | 161 | 95 | 94 | 97 | 97 | 94 | 95 |
| 164 | 128 | 128 | 164 | 165 | 159 | 159 | 164 | 165 | 91 | 90 | 96 | 96 | 91 | 90 |
| 168 | 128 | 128 | 168 | 169 | 157 | 157 | 168 | 169 | 87 | 86 | 98 | 98 | 87 | 86 |
| 172 | 128 | 128 | 172 | 173 | 156 | 156 | 172 | 173 | 83 | 82 | 99 | 99 | 83 | 82 |
| 176 | 128 | 128 | 176 | 177 | 155 | 155 | 176 | 177 | 79 | 78 | 100 | 100 | 79 | 78 |
| 180 | 128 | 128 | 180 | 181 | 153 | 153 | 180 | 181 | 75 | 74 | 102 | 102 | 75 | 74 |
| 184 | 128 | 128 | 184 | 185 | 152 | 152 | 184 | 185 | 71 | 70 | 103 | 103 | 71 | 70 |
| 188 | 128 | 128 | 188 | 189 | 151 | 151 | 188 | 189 | 67 | 66 | 104 | 104 | 67 | 66 |
| 192 | 128 | 128 | 191 | 191 | 149 | 149 | 192 | 193 | 64 | 64 | 106 | 106 | 63 | 62 |
| 196 | 128 | 128 | 187 | 187 | 148 | 148 | 196 | 197 | 68 | 68 | 107 | 107 | 59 | 58 |
| 200 | 128 | 128 | 183 | 183 | 147 | 147 | 200 | 201 | 72 | 72 | 108 | 108 | 55 | 54 |
| 204 | 128 | 128 | 179 | 179 | 145 | 145 | 204 | 205 | 76 | 76 | 110 | 110 | 51 | 50 |
| 208 | 128 | 128 | 175 | 175 | 144 | 144 | 208 | 209 | 80 | 80 | 111 | 111 | 47 | 46 |
| 212 | 128 | 128 | 171 | 171 | 143 | 143 | 212 | 213 | 84 | 84 | 112 | 112 | 43 | 42 |
| 216 | 128 | 128 | 167 | 167 | 141 | 141 | 216 | 217 | 88 | 88 | 114 | 114 | 39 | 38 |
| 220 | 128 | 128 | 163 | 163 | 140 | 140 | 220 | 221 | 92 | 92 | 115 | 115 | 35 | 34 |

TABLE 2-continued

| | FIG. 13A | | FIG. 13B | | FIG. 13C | | FIG. 13D | | FIG. 13E | | FIG. 13F | | FIG. 13G | |
|---|---|---|---|---|---|---|---|---|---|---|---|---|---|---|
| ref. | K1 table | K2 table | K1 table | K2 table | K1 table | K2 table | K1 table | K2 table | K1 table | K2 table | K1 table | K2 table | K1 table | K2 table |
| 224 | 128 | 128 | 159 | 159 | 139 | 139 | 222 | 222 | 96 | 96 | 116 | 116 | 33 | 33 |
| 228 | 128 | 128 | 155 | 155 | 137 | 137 | 210 | 210 | 100 | 100 | 118 | 118 | 45 | 45 |
| 232 | 128 | 128 | 151 | 151 | 136 | 136 | 198 | 198 | 104 | 104 | 119 | 119 | 57 | 57 |
| 236 | 128 | 128 | 147 | 147 | 135 | 135 | 186 | 186 | 108 | 108 | 120 | 120 | 69 | 69 |
| 240 | 128 | 128 | 143 | 143 | 133 | 133 | 174 | 174 | 112 | 112 | 122 | 122 | 81 | 81 |
| 244 | 128 | 128 | 139 | 139 | 132 | 132 | 162 | 162 | 116 | 116 | 123 | 123 | 93 | 93 |
| 248 | 128 | 128 | 135 | 135 | 131 | 131 | 150 | 150 | 120 | 120 | 124 | 124 | 105 | 105 |
| 252 | 128 | 128 | 131 | 131 | 129 | 129 | 138 | 138 | 124 | 124 | 126 | 126 | 117 | 117 |
| 255 | 128 | 128 | 128 | 128 | 129 | 129 | 129 | 129 | 127 | 127 | 126 | 126 | 126 | 126 |

Referring again to FIG. 12, once the binary data KL1' and KL2' that realize the dot overlap rate suited for large dots are obtained by the large dot quantization unit 26-1, these data are sent to the printer engine 3004 of FIG. 3 via the IEEE 1284 bus 3022. Further, when the binary data KS1' and KS2' that realize the dot overlap rate suited for small dots are obtained by the small dot quantization unit 26-2, they are sent to the printer engine 3004 of FIG. 3 via the IEEE 1284 bus 3022. The subsequent processing is executed by the printer engine 3004.

The printer engine 3004 performs the following operations. The printer engine 3004 stores the large dot first scan binary data KL1' 27-1 in a large dot first scan buffer 28-1 and then prints the binary data in the first scan by the associated large dot nozzles k1 or k2 of the nozzle array 54 or 55. The large dot second scan binary data KL2' 27-2 is stored in a large dot second scan buffer 28-2 and then printed in the second scan by the associated large dot nozzles k1 or k2 of the nozzle array 54 or 55. The small dot first scan binary data KS1' 27-3 is stored in a small dot first scan buffer 28-3 and then printed in the first scan by the associated small dot nozzles sk1 or sk2 of the nozzle array 54 or 55. The small dot second scan binary data KS2' 27-4 is stored in a small dot second scan buffer 28-4 and then printed in the second scan by the associated small dot nozzles sk1 or sk2 of the nozzle array 54 or 55.

With the above processing, dot overlap rates suited for large dots and for small dots can be realized by selecting appropriate thresholds for large dots and small dots independently of each other from a plurality of threshold columns (FIGS. 13A-13G) in Table 2. As a result, a satisfactory image with only a minimum level of image impairments such as graininess, density insufficiency and density unevenness can be produced in the entire density range from a low density region to a high density region.

It is noted that the quantization procedure is not necessarily limited to the one described above in which the decision on whether to print (1) or not to print (0) is made by the comparison of the data with a threshold. For example, in the case of two planes, a table may be prepared which directly converts K1' and K2' into "1" for printing or "0" for non-printing by using both of K1ttl and K2ttl as reference values. Detailed description of this table is omitted here, but the use of such a multidimensional table offers an advantage of being able to control the dot overlap rate with a greater degree of freedom in a more simple manner. When a one-dimensional threshold table such as Table 2 is used, the table can be prepared with a smaller memory capacity. It is also possible to use a one-dimensional threshold table with the sum of K1ttl and K2ttl as a reference value. Further, the binarization (quantization) may be performed only by branching and computation without using a table at all. In that case, if some coefficient used in the computation is set at a value that realizes a desired dot overlap rate, the intended advantage of this embodiment can be obtained. This can reduce the memory capacity even further when compared with cases where the above table is prepared.

(Fourth Embodiment)

In recent years, a printing process has been adopted in which main image processing is performed at a lower (coarser) resolution than the printing resolution and in which 256-grayscale multivalue image data is converted into a smaller-grayscale L-value data (L is 3 or higher) before being sent to the printer engine of the printing apparatus. In that case, the printer engine has a dot pattern (index pattern) in memory that converts the received smaller-grayscale L-value data into binary data conforming to the printing resolution. In the following, an example case of converting the 256-value image data into 3-value data will be explained. The value of L can of course take any other value not smaller than 3.

Figure 15:
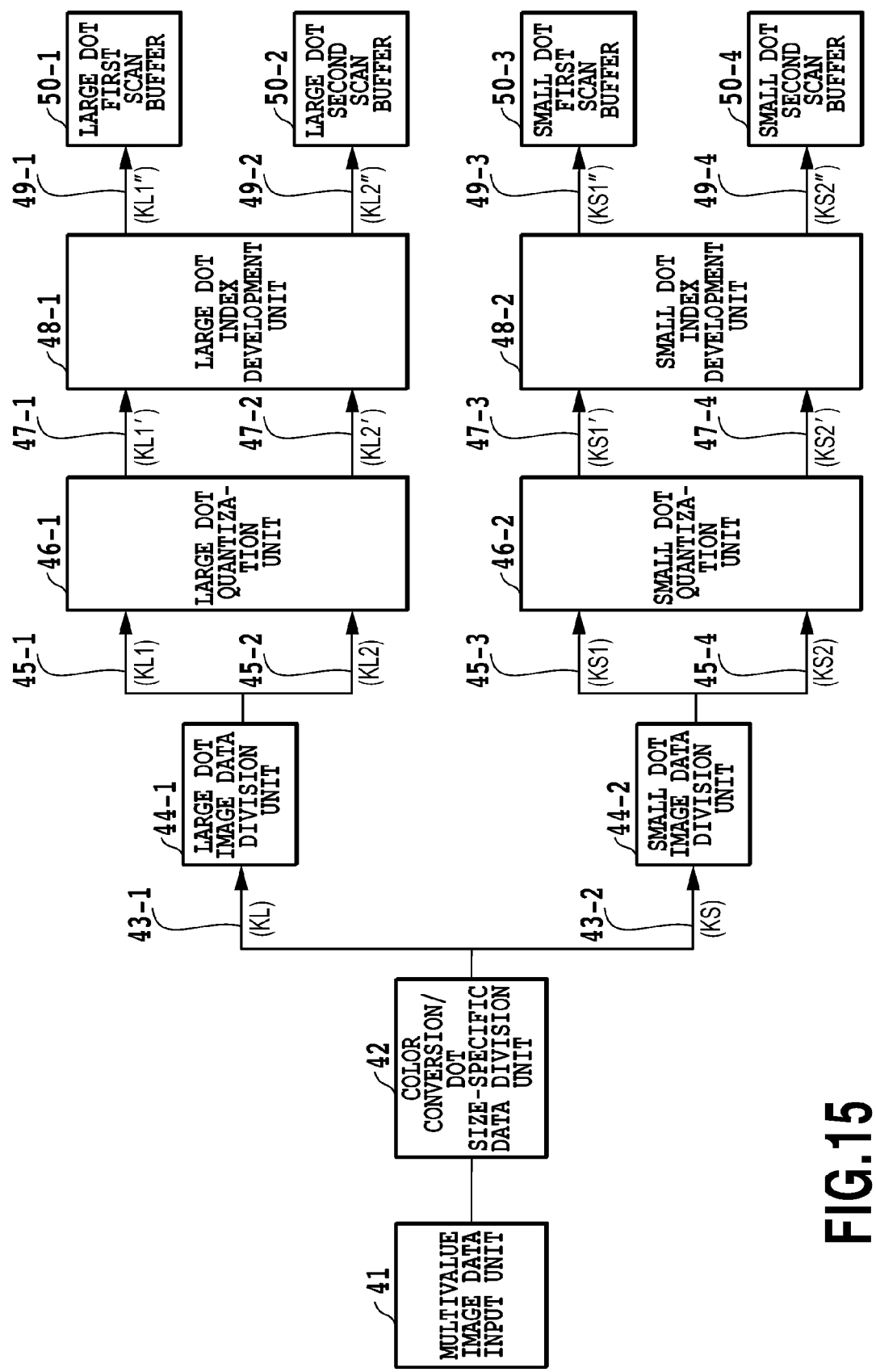
FIG. 15 is a block diagram showing image processing in a fourth embodiment.

FIG. 15 is a block diagram showing image processing performed during a multipass printing which completes an image in an area of interest (e.g., pixel area) by two printing scans. The process from the multivalue image data input unit 41 up to the large dot image data division unit 44-1 or up to the small dot image data division unit 44-2 is equivalent to those shown in FIG. 3 and FIG. 12. The processing that follows is done for individual colors independently and parallelly. So, the following explanation is given for only black (K) as an example.

Large dot multivalue data KL 43-1 is divided (converted) by a large dot image data division unit 44-1 into large dot first scan multivalue data KL1 45-1 and large dot second scan multivalue data KL2 45-2. Small dot multivalue data KS 43-2 is divided (converted) by a small dot image data division unit 44-2 into small dot first scan multivalue data KS1 45-3 and small dot second scan multivalue data KS2 45-4. At this time, this embodiment may distribute (generate) the CMYK data with a distribution rate biased toward the first scan or the second scan as in the first embodiment, or evenly distributed (generated).

The large dot first scan multivalue data KL1 and the large dot second scan multivalue data KL2 are entered into the large dot quantization unit 46-1 which converts them into three-value large dot first scan quantized data KL1' and three-value large dot second scan quantized data KL2', respectively. More specifically, in a first step, to two pieces of multivalue data K1 and K2 (i.e., KL1 and KL2) of a pixel of interest are added accumulated errors of adjoining pixels to obtain K1ttl and K2ttl, as in the quantization operation performed by the large dot quantization unit 26-1 of the second embodiment. Then, a threshold to be used in quantizing the first scan multivalue data (K1, i.e., KL1) is determined based on K2ttl, and a threshold to be used in quantizing the second scan multivalue data (K2, i.e., KL2) is determined based on K1*ttl*. Since this embodiment quantizes the image data into 3-value data, two thresholds—a first threshold and a second threshold larger than the first—are prepared. Then, depending on the magnitude relationship between a sum of the input multivalue data of the pixel of interest and the accumulated error value (sum of K1*ttl* and K2*ttl*) and the first and the second threshold, an output value is determined. That is, if the sum is equal to or greater than the second threshold, the output value is "2". If the sum is equal to or greater than the first threshold and less than the second threshold, the output value is "1". If the sum is less than the first threshold, the output is "0".

As described above, based on a threshold determined using K2*ttl*, the first scan multivalue data K1 is quantized to obtain the first scan quantized data K1' or KL1'. Similarly, based on a threshold determined using K1*ttl*, the second scan multivalue data K2 is quantized into the second scan quantized data K2' or KL2'. The first threshold and the second threshold can be determined individually from a first threshold table and a second threshold table by using the same reference value. The operation described above also applies to the small dot quantization unit 46-2.

Figure 14:
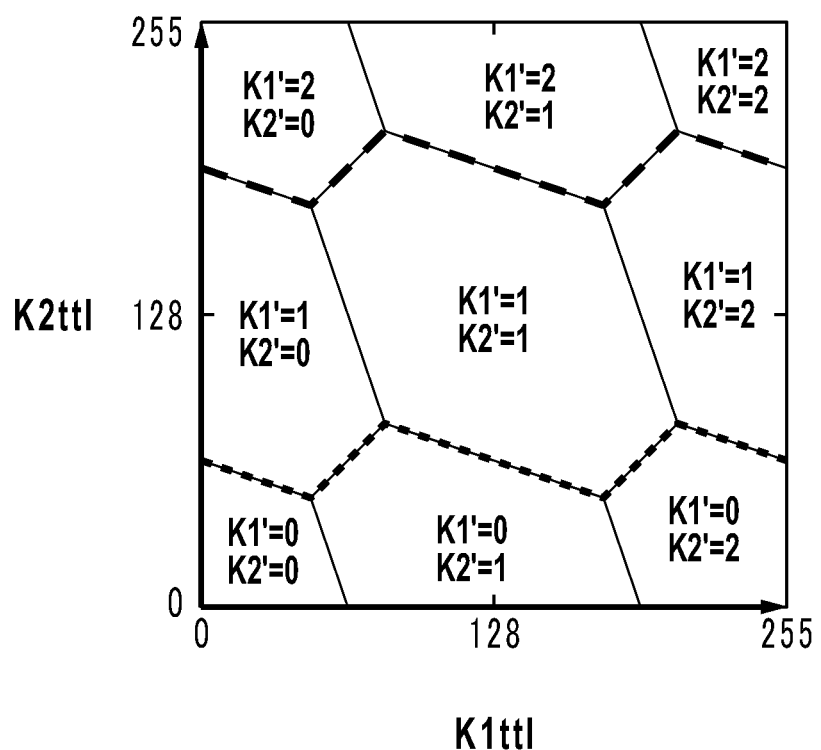
FIG. 14 is a diagram showing a relation between an input value and the result of quantization (into 3-value data)

FIG. 14 shows a relation between the result of performing quantization (into 3-value data) by the quantization unit 46-1 or 46-2 (K1 and K2) and the input values (K1*ttl* and K2*ttl*), as in FIGS. 13A to 13G. In the figure, the values of K1' and K2' represent the numbers of dots printed in the pixel of interest by the first printing scan and the second printing scan, respectively. Here, the first threshold used in the quantization of K2*ttl* is shown as a thick dotted line and the second threshold as a thick dashed line.

For example, a pixel of interest where both of K1' and K2' have "2" is printed with two dots by the first printing scan and two dots by the second printing scan. In a pixel of interest with K1' being "1" and K2' being "2", one dot is printed by the first scan and two dots by the second scan. In a pixel of interest with both K1' and K2' being "0", no dot is printed.

Although only an example of FIG. 14 is shown here, this embodiment, too, prepares the first threshold table and the second threshold table independently for large dots and for small dots. This can change the quantized result between the large dot quantization unit 46-1 and the small dot quantization unit 46-2, thereby enabling the dot overlap rate to be adjusted appropriately for large dots and for small dots.

Referring again to FIG. 15, the three-value image data KL1' and KL2' quantized by the large dot quantization unit 46-1 are sent to the printer engine 3004 where they are subjected to an index development operation by a large dot index development unit 48-1. Further, the three-value image data KS1' and KS2' quantized by the small dot quantization unit 46-2 are sent to the printer engine 3004 where they are subjected to an index development operation by a small dot index development unit 48-2. The index development operation binarizes the L-value quantized data (L is an integer equal to or greater than 3) and can be taken as part of the quantization operation. Detailed descriptions of the index development operations for large dots and small dots will be given later.

The large dot index development unit 48-1 converts the three-value image data KL1' into first scan binary data KL1" 49-1 and the three-value image data KL2' into second scan binary data KL2" 49-2. Then, the large dot first scan binary data KL1" is stored in a large dot first scan buffer 50-1 and then printed in the first scan by the associated large dot nozzles k1 or k2 of the nozzle array 54 or 55. Further, the large dot second scan binary data KL2" is stored in a large dot second scan buffer 50-2 and then printed in the second scan by the associated large dot nozzles k1 or k2 of the nozzle array 54 or 55. Meanwhile, the small dot first scan binary data KS1" 49-3 is stored in a small dot first scan buffer 50-3 and then printed in the first scan by the associated small dot nozzles sk1 or sk2 of the nozzle array 54 or 55. Further, the small dot second scan binary data KS2" 49-4 is stored in a small dot second scan buffer 50-4 and then printed in the second scan by the associated small dot nozzles sk1 or sk2 of the nozzle array 54 or 55.

Figure 16:
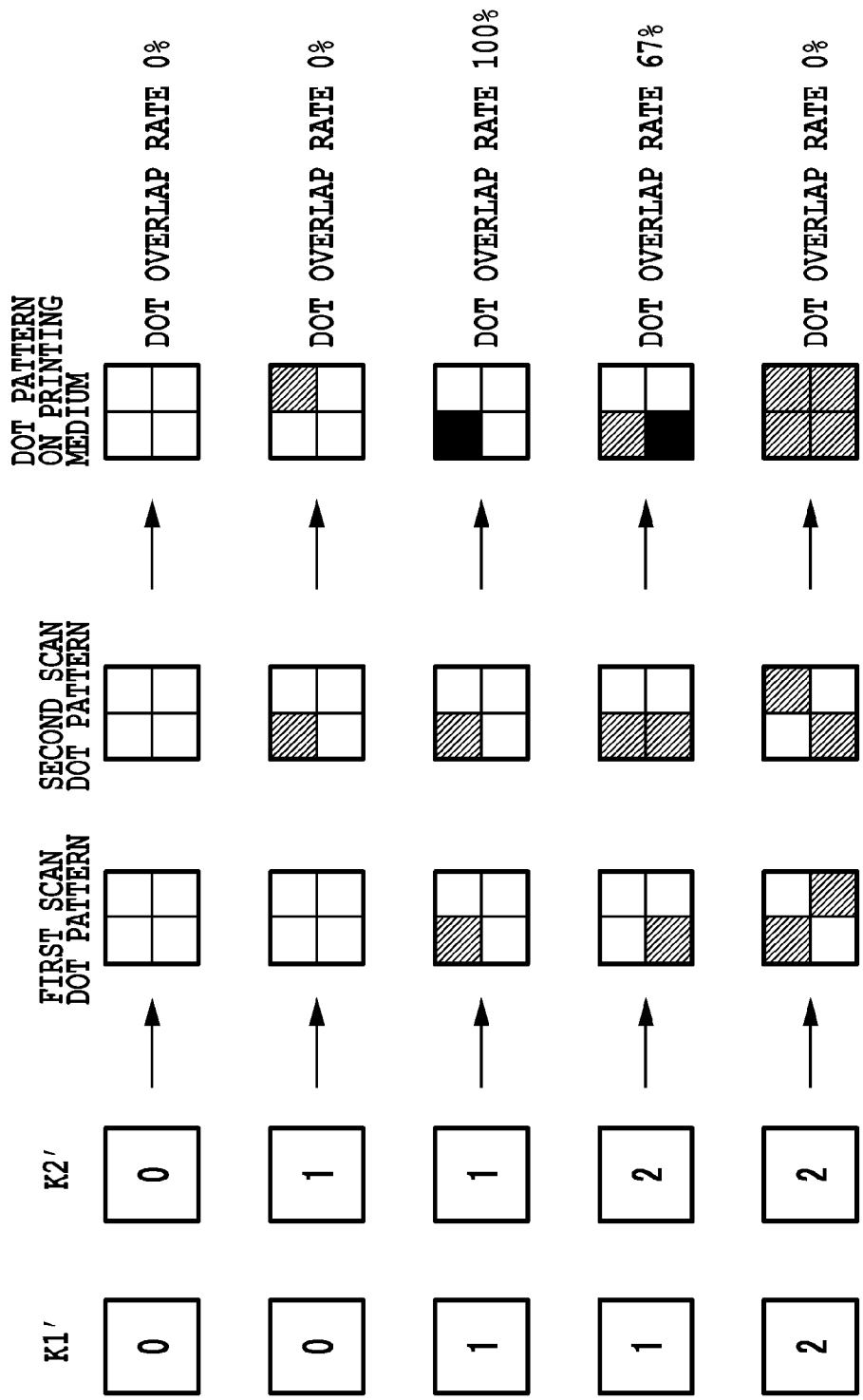
FIG. 16 is a diagram showing a relation between an index pattern and a dot overlap ratio.

FIG. 16 shows the index development operation and example index patterns (dot patterns) in this embodiment. In this figure, two pieces of input multivalue data to be binarized, whether they are for large dots or small dots, are represented by K1' and K2'. That is, in the case of large dots, K1' and K2' are equivalent to KL1' and KL2' and, in the case of small dots, KS1' and KS2'.

The index development units 48-1 and 48-2 in this embodiment convert the three-value image data K1', K2' for one pixel into binary image data (dot pattern) for a 2-subpixel-by-2-subpixel area. In more detail, the three-value image data K1' having one of three values—0, 1 and 2—is converted into a dot pattern for the first scan.

Similarly, the three-value image data K2' having one of the three values 0, 1, 2 is converted into a dot pattern for the second scan. Then, the first scan dot pattern and the second scan dot pattern superimposed together (shown at the rightmost column in the figure, described as "dot pattern formed on a print medium") are printed in one pixel. As to the dot patterns for the first and the second scan, shaded squares represent data "1" that instructs the printing of a dot in subpixels and blank squares represent data "0" that instructs the non-printing of a dot in subpixels. As to the dot patterns on a print medium, black squares represent subpixels in each of which two dots are printed, shaded squares represent subpixels in each of which one dot is printed, and blank squares represent subpixels in each of which no dot is formed.

Here, a dot overlap rate, which results from the image processing that converts three or higher-value image data for a pixel into a binary subpixel dot pattern for m×n subpixels making up the one pixel, will be explained by referring to FIG. 16. In such a case, the "dot overlap rate" refers to a percentage of dots to be printed at the same subpixel positions in a pixel area by different scans (or by different printing element groups) with respect to a total number of dots to be printed in one pixel area composed of a plurality of subpixels. More specifically, if both K1' and K2' are "0", no dots are printed either in the first printing scan or the second printing scan and thus the dot overlap rate is 0%. If either K1' or K2' is "0", dots are printed in only one of the two scans and the dot overlap rate remains 0%. If both K1' and K2' are "1", two dots are printed overlappingly in an upper left subpixel of the 2-subpixel-by-2-subpixel area and the dot overlap rate in this case is 100% (=2÷2×100). If one of K1' and K2' is "1" and the other is "2", two dots are printed overlappingly in a lower left subpixel of the 2-subpixel-by-2-subpixel area and one dot is printed in an upper left subpixel. So, the dot overlap rate is 67% (=2÷3×100). Further, if both K1' and K2' are "2", shaded subpixels do not overlap and the dot overlap rate is 0%. That is, by preparing index patterns (dot patterns) beforehand that provide one-to-one match with different levels shown in FIG. 16, a combination of K1' and K2' is determined in the quantization operation shown in FIG. 14, which in turn uniquely determines the dot overlap rate in the pixel area.

Next, a relation between the dot overlap rate and the density region in this embodiment will be explained by referring to FIG. 16. In the example of FIG. 16, one pixel can be printed with up to four dots. So, a printing rate of 100% refers to a pixel printed with four dots. If K1'=0 and K2'=0, the printing rate is 0%; if K1'=1(or 0) and K2'=0 (or 1), the printing rate is 25%. If K1'=1 and K2'=1, the printing rate is 50%. Where K1'=1 (or 2) and K2'=2 (or 1), the printing rate is 75%. Where K1'=2 and K2'=2, the printing rate is 100%. In low-density regions with printing rate of 0% and 25%, the dot overlap rates are 0%. In medium-density regions with a printing rate of 50%, the dot overlap rate is 100%. In high-density regions with print duties of 75% and 100%, the dot overlap rates are 67% and 0% respectively.

As described above, in the index patterns, the positions and the number of dots to be printed are differentiated between the first scan dot pattern and the second scan dot pattern prepared beforehand in order to adjust the dot overlap rate at each level of gradation. Further, by preparing the first scan dot pattern and the second scan dot pattern separately for the large dot index development unit 48-1 and for the small dot index development unit 48-2, the dot overlap rate can be differentiated between large dots and small dots. In this embodiment, although the dot overlap rates for large dots and for small dots can be adjusted separately by differentiating the threshold tables in the quantization units 46-1 and 46-2, they can also be adjusted by changing the index patterns. For example, in medium-to-high density regions, the following arrangements may be made. The dot overlap rate may be set high in medium level regions (K1'=K2'=1) where there are concerns for density unevenness and, in high level regions (K1'=K2'=2) where there are concerns for insufficient density, the dot overlap rate may be set low, as shown in FIG. 16. As for small dots used in low-to-medium density regions, the dot overlap rate may be set high in high level regions (K1'=K2'=2) and set low in medium level regions (K1'=K2'=1) by using index patterns different from those of FIG. 16. That is, by preparing a plurality of different index patterns, individual dot overlap rates can be adjusted to appropriate values that best match particular dot sizes.

As described above, this embodiment prepares different dot patterns separately for large dots and for small dots that are used in converting multivalue data—whose grayscale multivalue range has been reduced by the quantization unit—into binary data conforming to the printing resolution. This can realize different dot overlap rates that are suited for large dots and small dots and for any particular level of gradation, producing high quality images free from noticeable density unevenness, graininess or insufficient density in the entire grayscale range.

(Fifth Embodiment)

This embodiment describes a method which involves properly adjusting the dot overlap rate for large dots by the image data division unit or the quantization unit but, for small dots, setting the dot overlap rate to 0 without performing the characteristic processing.

Figure 20:
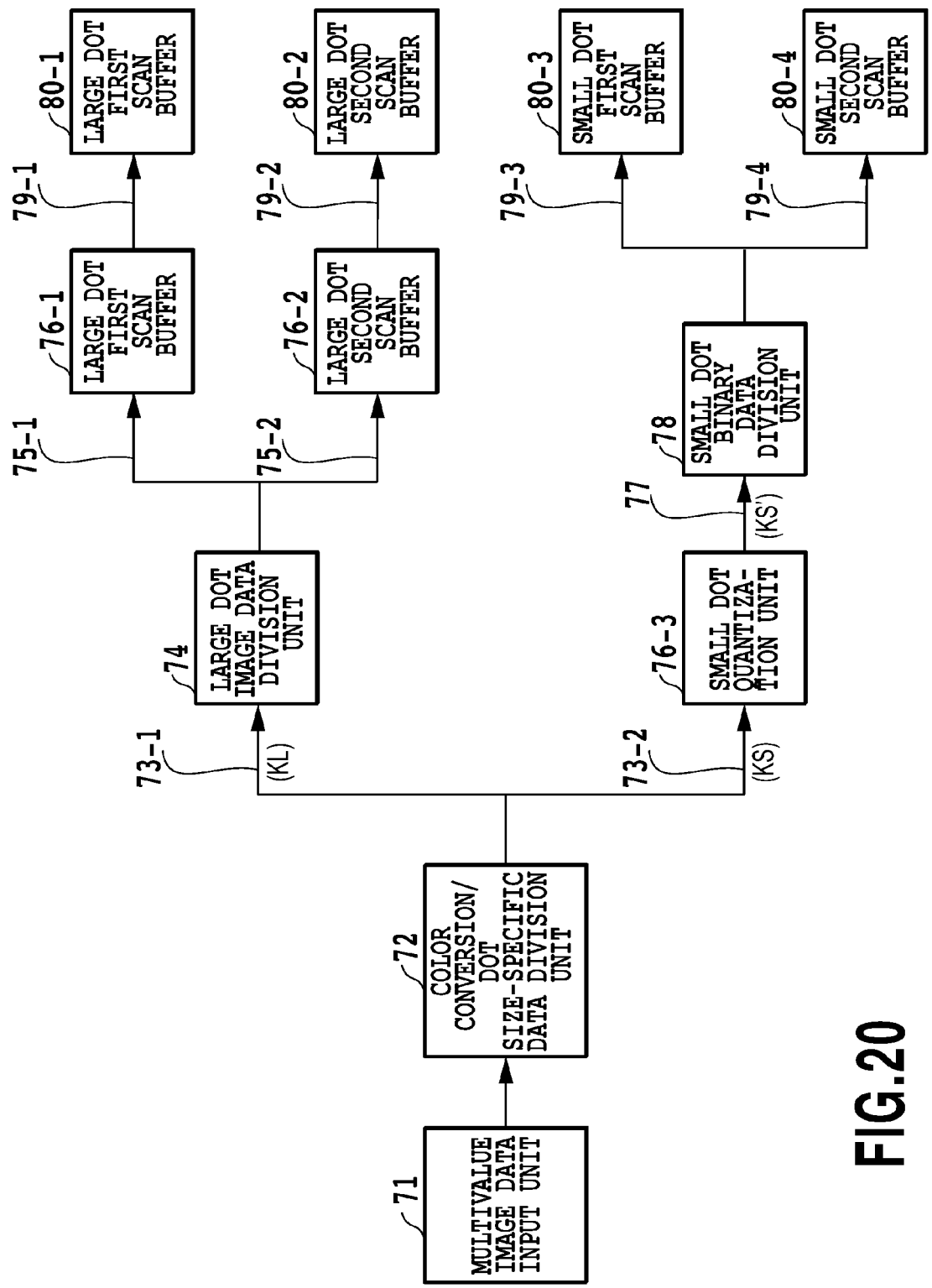
FIG. 20 is a block diagram showing image processing in a fifth embodiment.

FIG. 20 is a block diagram of this embodiment showing image processing performed during a multipass printing that completes an image in an area of interest (e.g., pixel area) by two printing scans. The operations executed by a multivalue image data input unit 71 and a color conversion/dot size-specific data distribution unit are similar to those of FIG. 3 and FIG. 12. The subsequent operations associated with large dots are also similar to those of the first embodiment, so their explanations are omitted. As for small dots, the following operations will be explained for only black (K).

Small dot multivalue data KS 73-2 generated by the color conversion/dot size-specific data division unit 72 is entered, as is, into a small dot quantization unit 76-3, without being divided between the first scan and the second scan, in which the received data is subjected to the quantization operation using the conventional error diffusion method. The quantization operation converts the image data for individual pixels into binary data KS'—either "1" which represents an instruction to print a small dot or "0" which represents an instruction not to print a small dot. Then the image data KS' is sent to the printer engine 3004 via the IEEE 1284 bus 3022. In the printer engine 3004, the small dot binary image data KS' 77 is divided into first scan binary data and second scan binary data by a small dot binary data division unit 78.

Figure 5:
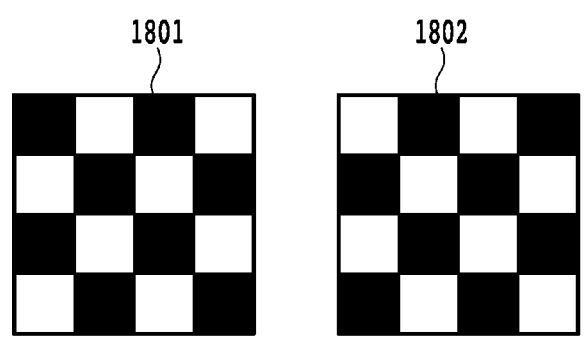
FIG. 5 is a diagram showing an example of mask applicable to this invention.

The small dot binary data division unit 78 executes the division operation using masks stored beforehand in memory. The mask is a set of predetermined data of 1s and 0s, the "1" permitting binary image data to be printed in a pixel, the "0" not permitting the binary image data to be printed in the pixel. The mask data, when they are logically ANDed with the binary image data for each pixel, can divide the binary image data. In dividing binary image data into N parts, N masks are generally used. In this embodiment where binary image data is divided into two parts for two scans, two masks 1801, 1802 as shown in FIG. 5 are used. Black portions represent mask data 1 permitting image data to be printed (i.e., it does not mask the image data) and blank portions represent mask data 0 not permitting image data to be printed (i.e., it masks the image data). The mask 1801 is used to generate binary data for the first scan and the mask 1802 used to generate binary data for the second scan. The two masks are complementary, so the binary data divided by these masks do not overlap each other. Thus, the probability of small dots printed by different scans overlapping each other on a print medium surface can be suppressed and the dot overlap rate of small dots kept lower than that of large dots, minimizing graininess.

After having been divided by the masks, the small dot first scan binary data 79-3 is stored in a small dot first scan buffer 80-3 and then printed in the first scan by the associated small dot nozzles sk1 or sk2 of the nozzle array 54 or 55. Further, the small dot second scan binary data 79-4 is stored in a small dot second scan buffer 80-4 and then printed in the second scan by the associated small dot nozzles sk1 or sk2 of the nozzle array 54 or 55.

In this embodiment, when two sets of binary image data for the two scans are superimposed, there are some positions where large dots overlap (some pixels have "1" in both planes). This results in a printed image tolerant to density variations. As for small dots, there are no positions or pixels where dots overlap, so no degraded graininess caused by the overlapping of dots can occur. Therefore, in the entire density range from low density regions where small dots are predominantly used to medium to high density regions where large dots are predominantly used, a satisfactory image free from noticeable image impairments such as graininess and density variations can be produced.

The fifth embodiment has described an example case where density unevenness is more conspicuous with large dots than small dots and where small dots pose a greater concern for graininess than for density unevenness. However, under circumstances where density unevenness shows more conspicuously with small dots than large dots, the aforementioned relationship may be reversed. In either case, for dot diameters that will hardly pose a problematical level of density unevenness, it is preferred that the quantization operation be executed before the division operation, as in this embodiment, because this arrangement does not increase the burden of binarization operation unnecessarily or pose new concerns for graininess and insufficient density.

(Sixth Embodiment)

In this embodiment, image processing to print images with three sizes of dots—large dots, medium dots and small dots—will be explained.

Figure 22A:
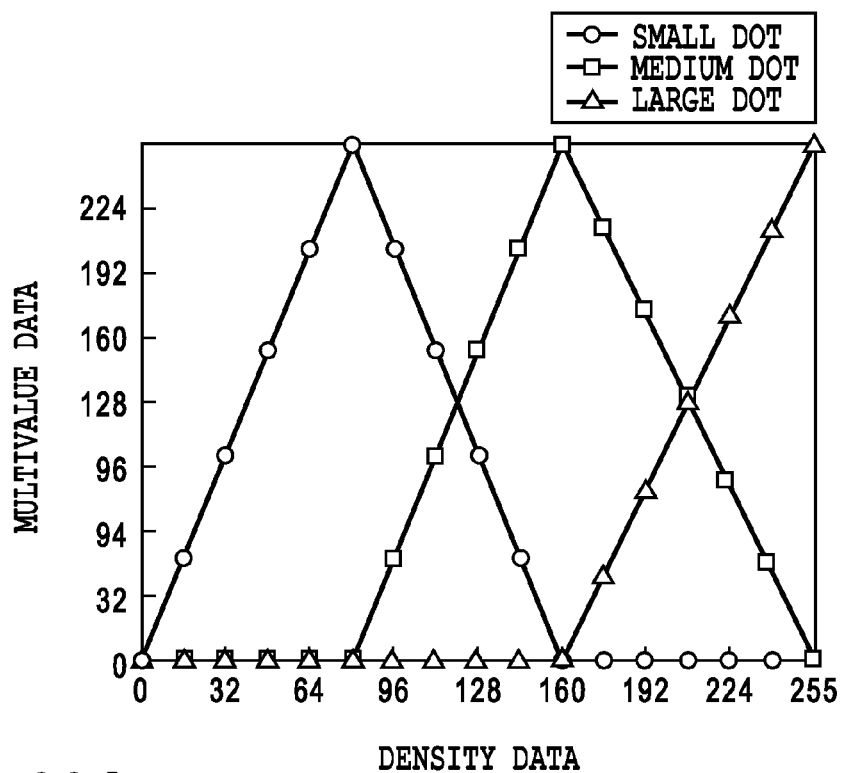
FIGS. 22A-22D are graphs showing examples of multi-value density data to be distributed to different dot sizes when three dot sizes are used.

FIG. 22A shows multivalue density data that are distributed to large, medium and small sizes of dots when an image is formed using the three dot sizes. In general printing apparatus using large, medium and small dots, the distribution of multivalue data to respective dot sizes are performed in a manner shown in graphs of FIG. 22A.

Figure 21:
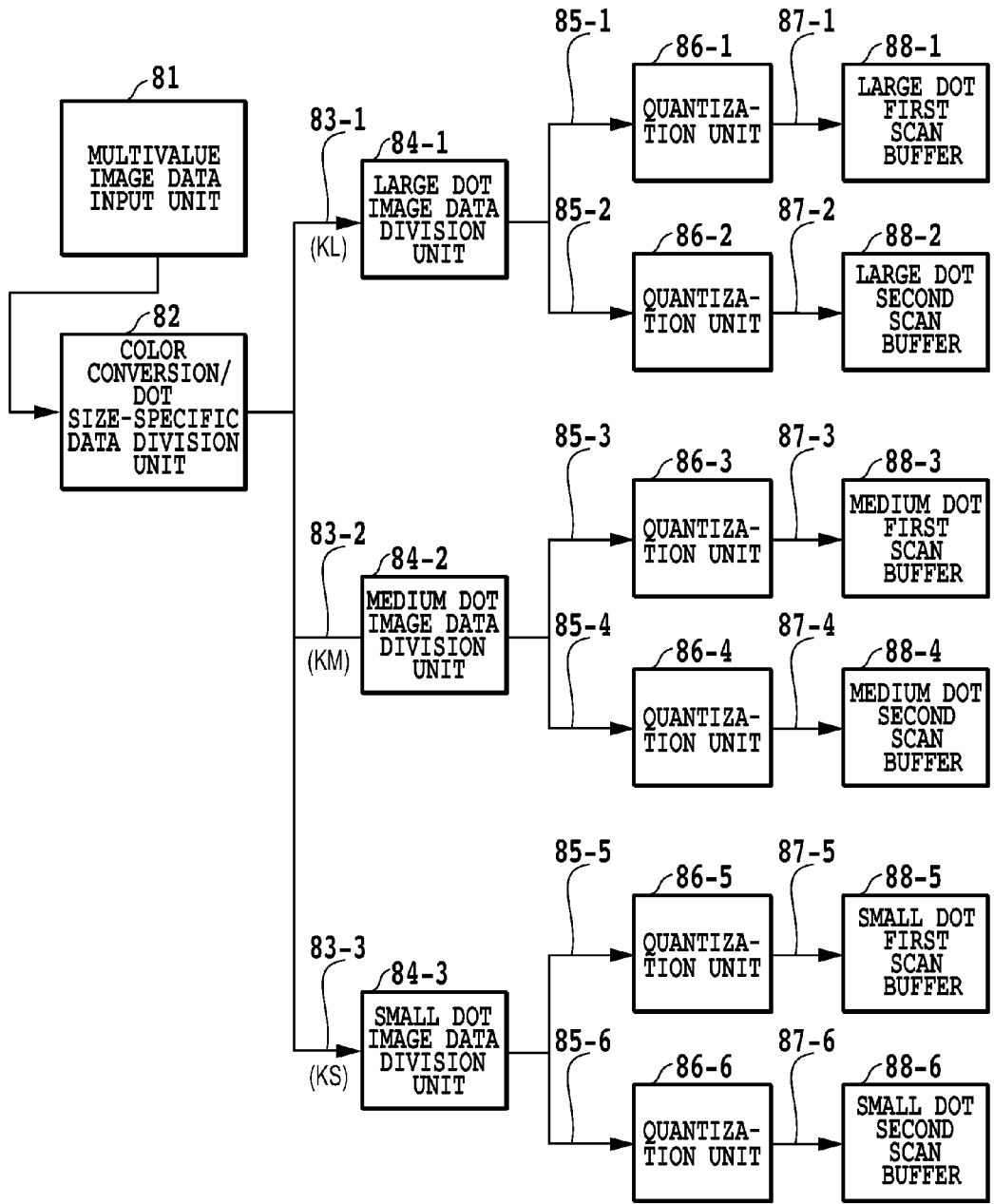
FIG. 21 is a block diagram showing image processing in a sixth embodiment.

FIG. 21 is a block diagram showing a series of steps performed in the image processing of this embodiment, as in FIG. 3. A color conversion/dot size-specific data distribution unit 82 distributes, based on distribution rates shown in FIG. 22A, the input image data for a pixel of interest into three pieces of multivalue data—large dot multivalue data 83-1, medium dot multivalue data 83-2 and small dot multivalue data 83-3. That is, the color conversion/dot size-specific data distribution unit 82 generates large dot multivalue data (CL, ML, YL, KL), medium dot multivalue data (CM, MM, YM, KM) and small dot multivalue data (CS, MS, YS, KS). Then, the multivalue data of three dot sizes are entered into a large dot image data division unit 84-1, a medium dot image data division unit 84-2 and a small dot image data division unit 84-3, respectively, where they are divided between the first scan and the second scan. At this time, the large dot image data division unit 84-1, the medium dot image data division unit 84-2 and the small dot image data division unit 84-3 have different distribution rates to realize dot overlap rates suited for large dots, medium dots and small dots, respectively. The image processing that is subsequently performed for each dot size is similar to that shown in FIG. 3 and its explanation therefore is omitted.

Referring again to FIG. 22A, in intermediate to high density regions where a change in the dot overlapping state is likely to affect the dot overlap rate on a print medium surface resulting in density unevenness, this embodiment uses the medium dots most frequently. So, it is desired that the medium dots be set at a higher dot overlap rate than those of small and large dots. Meanwhile, in low density regions where image impairments are more likely to emerge as graininess than as density unevenness, small dots are predominantly used. So, it is desired that the dot overlap rate for small dots be set lower than that for medium dots. Further in high density regions where importance is given to the improvement of highest density, it is desired to avoid a reduction in coverage rate caused by dots overlapping each other. So, it is desired that the dot overlap rate for large dots that are predominantly used in this density region be set lower than that for medium dots.

Figure 18A:
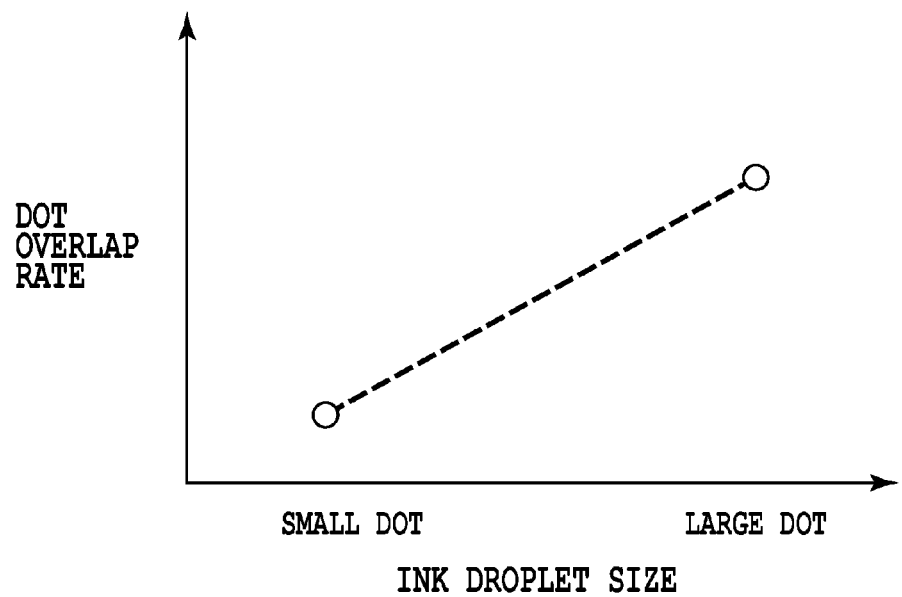
FIGS. 18A and 18B are graphs showing relations between the dot diameter and the dot overlap rate.
Figure 19A:
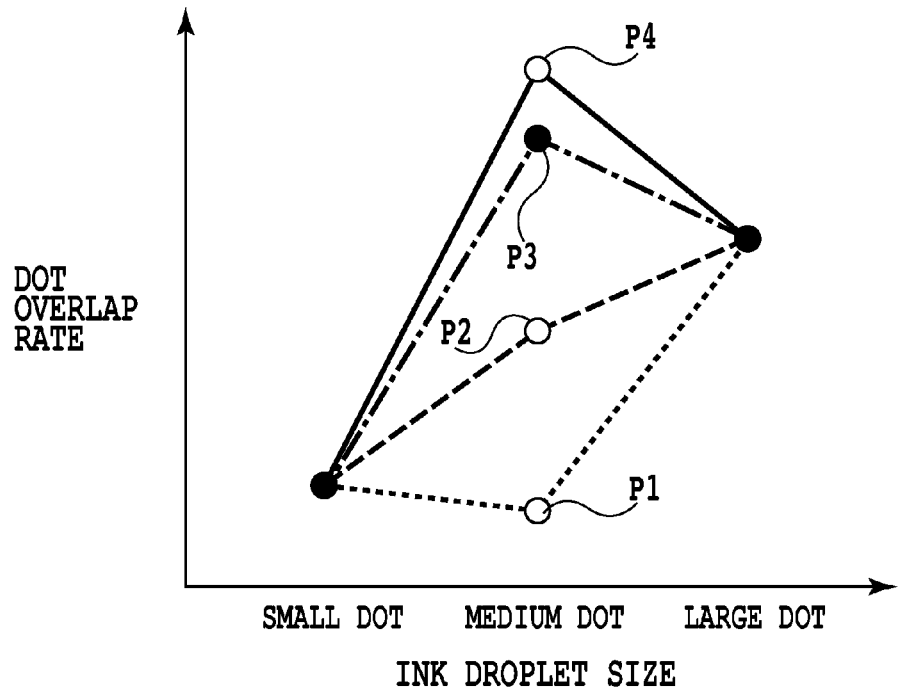
FIGS. 19A and 19B are graphs showing relations between the dot diameter and the dot overlap rate.

FIG. 19A shows a relationship in dot overlap rate between small dots, medium dots and large dots in connection with the graphs of FIG. 18A that represents the dot overlap rates of large and small dots. In the diagram of FIG. 19A the dot overlap rates of large dots and small dots are set at the same levels as those shown in FIG. 18A. Medium dots are shown to have a dot overlap rate P3 set higher than those of the other sizes of dots.

Figure 18B:
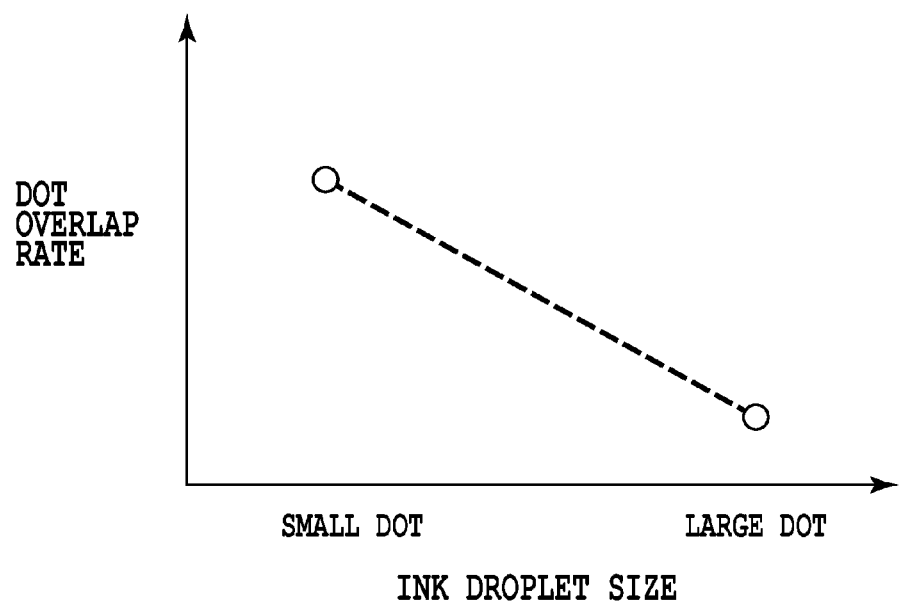
Figure 19B:
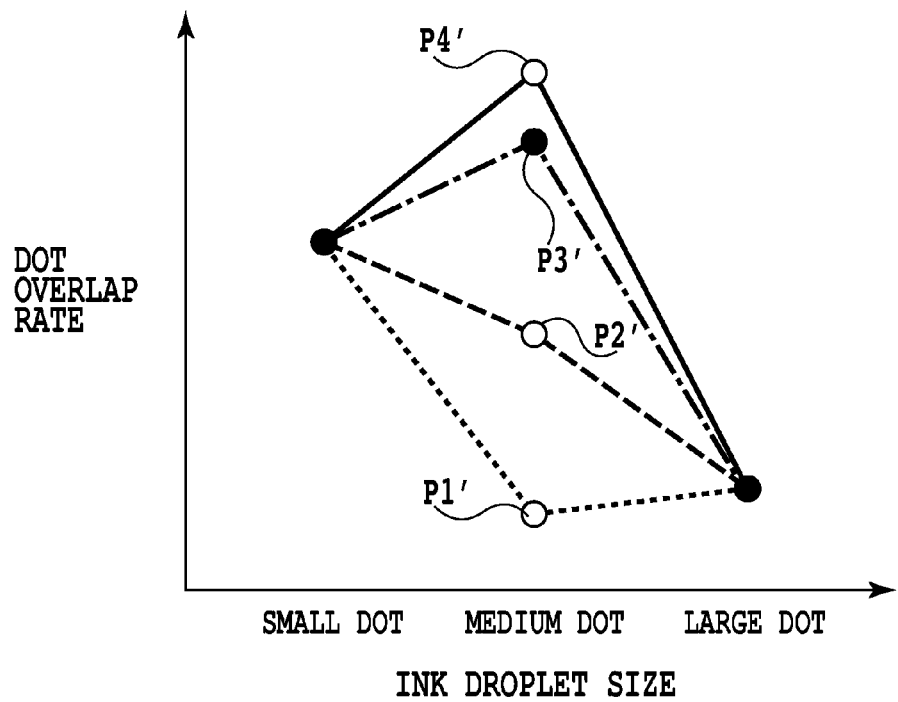

FIG. 19B shows a relationship in dot overlap rate between small dots, medium dots and large dots in connection with the graphs of FIG. 18B that represents the dot overlap rates of large and small dots. In the diagram of FIG. 19B the dot overlap rates of large dots and small dots are set at the same levels as those shown in FIG. 18B. Medium dots are shown to have a dot overlap rate P3' set higher than those of the other sizes of dots.

In this embodiment, to realize such dot overlap rates according to the dot size, different division units—large dot image data division unit 84-1, medium dot image data division unit 84-2 and small dot image data division unit 84-3—use different distribution rates in the data division operation. More specifically, for example, if the dot overlap rate relation represented by P3 in FIG. 19A is to be achieved, the bias of the distribution rates for three sizes of dots used in dividing the image data are arranged in a descending order of medium dots, large dots and small dots. This distribution rate bias allows the dot overlap rate for medium dots to be set highest among the three sizes of dots while keeping the dot overlap rate for large dots higher than that for small dots. Further, if the dot overlap rate relation represented by P3' in FIG. 19B is to be achieved, the bias of the distribution rates for three sizes of dots used in dividing the image data are arranged in a descending order of medium dots, small dots and large dots. This distribution rate bias allows the dot overlap rate for medium dots to be set highest among the three sizes of dots while keeping the dot overlap rate for small dots higher than that for large dots.

Figure 22B:
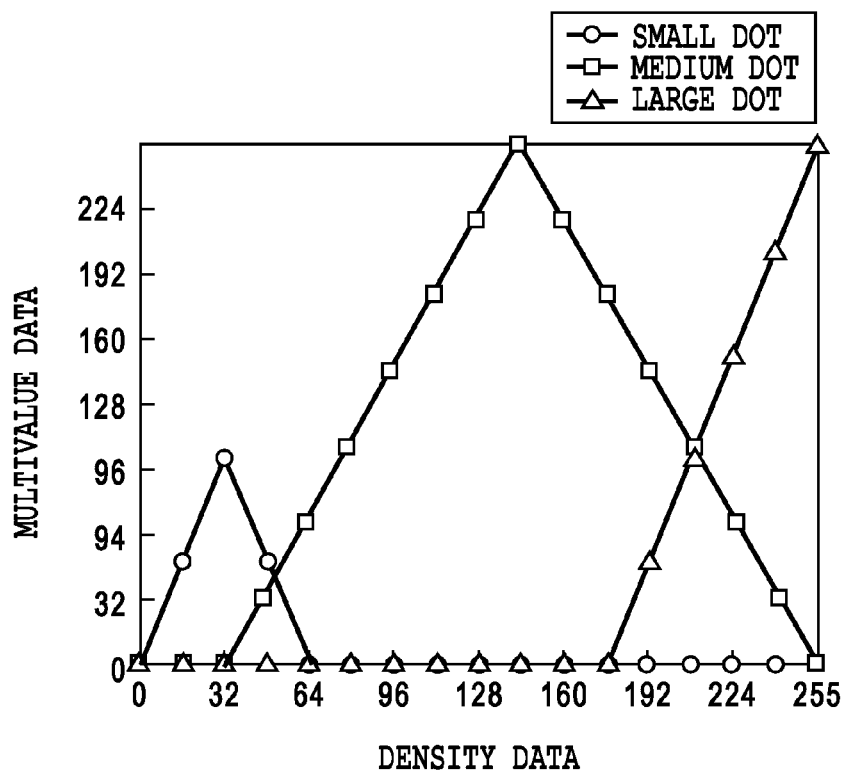

It is noted, however, that the dot overlap rate for medium dots is not necessarily desirable to be set higher than those of large dots and small dots. For example, where the multivalue density data to be distributed to the three dot sizes is in a state of FIG. 22B, that is, the area in an intermediate density region where medium dots are used is wider than that of FIG. 22A, it is desired that the dot overlap rate for medium dots be raised even higher. In that case, the dot overlap rate for medium dots needs to be adjusted to a level represented by P4 of FIG. 19A or P4' of FIG. 19B.

Figure 22C:
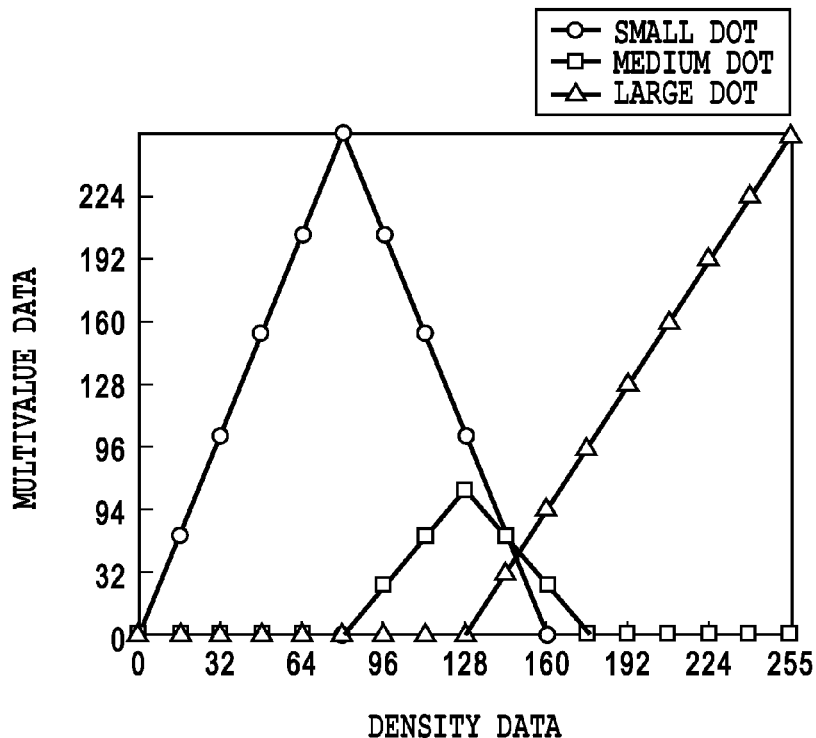

Further, if the multivalue density data to be distributed to the three dot sizes is in a state of FIG. 22C, that is, the utilization rate of medium dots in the intermediate density region is sufficiently lower than that of FIG. 22A, it is desired that the dot overlap rate for medium dots be set lower than those of large dots and small dots. In that case, the dot overlap rate for medium dots needs to be adjusted to a level represented by P1 of FIG. 19A or P1' of FIG. 19B.

Figure 22D:
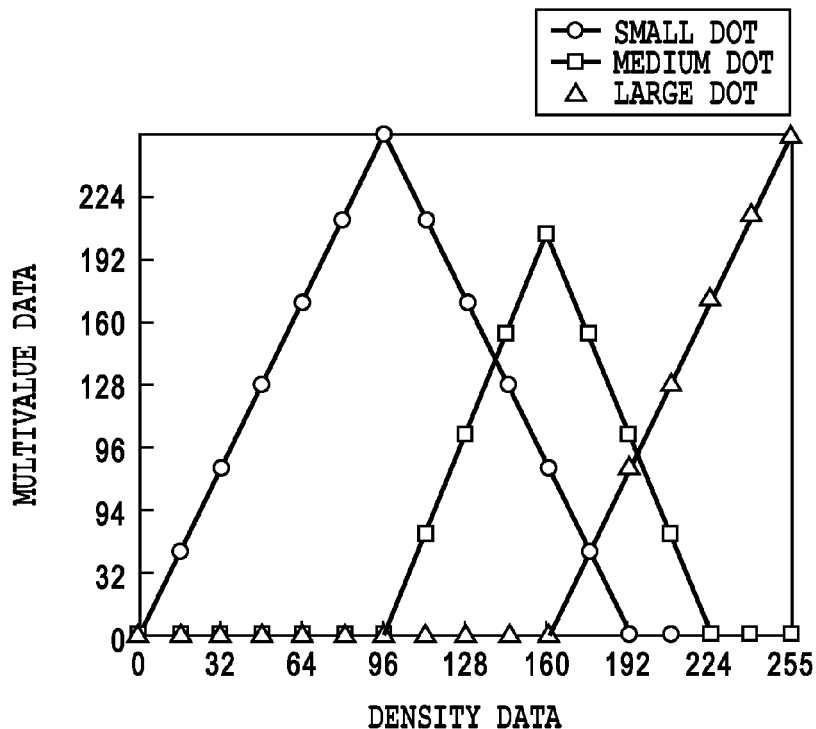

Further, if the multivalue data to be distributed to the three dot sizes is in a state of FIG. 22D, that is, the utilization rate of medium dots in the intermediate density region is lower than that of FIG. 22A but higher than that of FIG. 22C, it is desired that the dot overlap rate for medium dots be set between those of large dots and small dots. In that case, the dot overlap rate for medium dots needs to be adjusted to a level represented by P2 of FIG. 19A or P2' of FIG. 19B.

In either case, which of the graininess reduction, the avoidance of density insufficiency and the suppression of density unevenness should be given priority and to what degree varies depending on the absolute and relative values of dot sizes and the dot contrast relative to a print medium. If, for each of these conditions, an optimal dot overlap rate is set for each dot size and the image data is divided among individual dot sizes according to the distribution rates that realize the setting of dot overlap rates, then the intended effect of this embodiment can be produced.

As described above, with this embodiment when an image is printed using large dots, medium dots and small dots, it is possible to produce a satisfactory image with reduced density unevenness, graininess or density insufficiency in the entire grayscale range from low to high density regions.

(Variation of Sixth Embodiment)

The similar advantage offered by the sixth embodiment using large, medium and small dots can also be obtained by a method similar to those of the third and fourth embodiment, i.e., by differentiating the parameter used in quantization operation among different dot sizes. For example, using the threshold table of FIG. 13D for small dots, the threshold table of FIG. 13B for large dots and the threshold table of FIG. 13C for medium dots can realize the relative relationship in dot overlap rate among different dot sizes represented by black solid circles (P3) of FIG. 19A. Further, by using the threshold table of FIG. 13D for large dots, the threshold table of FIG. 13B for small dots and the threshold table of FIG. 13C for medium dots, a relative relationship in dot overlap rate among different dot sizes represented by black solid circles (P3') can be realized.

(Other Embodiments)

In the foregoing embodiments we have described example cases in which, as shown in FIG. 11A, a print head comprises a plurality of chips, each formed with a nozzle array composed of two sizes of ejection openings. This invention, however, is not limited to this kind of print head.

Figure 11B:
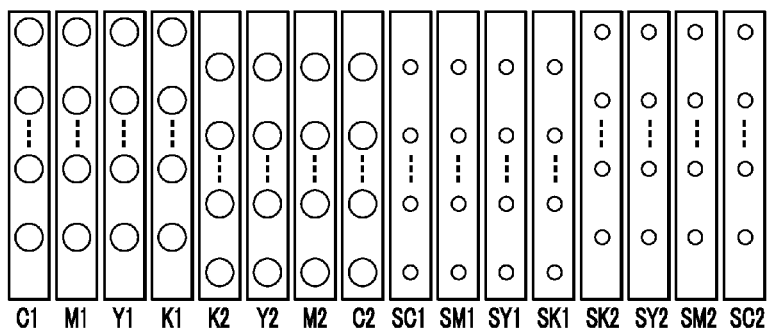

FIG. 11B shows another example of print head that can be used in this invention. The print head of this example has two groups of chips, one group consisting of eight large dot nozzle arrays (chips) and one group consisting of eight small dot nozzle arrays (chips). This type of print head, too, can produce similar advantageous effects to those of the foregoing embodiments as long as the binary data stored in a large dot buffer and a small dot buffer are so transferred to the print head that they are printed in appropriate printing scans by appropriate nozzle arrays.

Figure 11C:
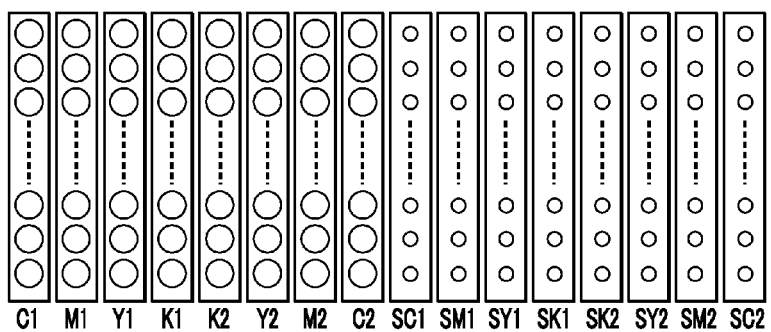

FIG. 11C shows a still another example of print head that can be used in this embodiment. This print head has a plurality of nozzle array pairs each of which can print dots of the same size and the same ink on a line of pixels running in the main scan direction. When this kind of print head is used, the binary data stored in each of the buffers described in the above embodiments needs to be divided further between a plurality of nozzle arrays. Such a dividing operation may be identical with that performed, for example, by the small dot binary data division unit 78 in the fifth embodiment. That is, the binary data can be divided between two nozzle arrays by undergoing a logical AND operation with two mask patterns that are complementary with each other.

In the foregoing embodiments although an example case of so-called 2-pass printing has been explained which completes an image on an area of interest (e.g., a pixel area) by two relative movements, this invention is not limited to the 2-pass printing. This invention can be applied widely to M-pass printing operations (M is an integer equal to or greater than 2), i.e., three and greater number-pass printing operations can also be performed. If an M-pass printing is to be executed using N dot sizes, N pieces of dot size-specific multivalue density data are first generated from input image data (RGB). Then, from each piece of the multivalue data, M sets of multivalue data are produced that correspond to M relative movements or M printing scans. Next, N×M sets of multivalue density data are each quantized to generate N×M sets of quantized data corresponding to the N dot sizes and the M printing scans. Then, according to the N×M sets of quantized data, M printing scans are executed for each of the N dot sizes to form an image in the area of interest.

If, in the M-pass printing, the dot overlap rate is controlled as explained in the third and the fourth embodiment, the threshold table will be represented in M dimensions using K1$ttl$ to KMttl as coordinate axes, rather than in two dimensions as it is represented in FIGS. 13A to 13G and FIG. 14.

In 3 or higher number-pass printing mode (M-pass mode), it is not essential to generate M sets of multivalue data but P sets of multivalue data (P is an integer equal to or greater than 2 but less than M) may be generated. In that case, P sets of image data, fewer than M sets, may first be generated, followed by the quantization of P sets of density data to produce P sets of quantized data. Then, of the P sets of quantized data, at least one set of quantized data may be divided to produce M sets of quantized data for M passes.

While in the foregoing embodiments example configurations using the four ink colors of CMYK have been described, the applicable ink colors are not limited to the four. To the four ink colors may be added light cyan (Lc) or light magenta (Lm). It is also possible to add characteristic ink colors such as red (R) and blue (B). Conversely, this invention may be applied to a mono-color mode that uses a single color ink. Further, this invention can also be applied to monochrome printers as well as color printers.

In the preceding embodiments, although the image processing up to the quantization operation has been described to be performed by the control unit 3000 and the subsequent operations by the printer engine 3004, this invention is not limited to this arrangement. As long as the sequence of operations described above is executed, whether by hardware or software, any arrangement falls within the scope of this invention.

While the preceding embodiments have described as an example the printing apparatus (image forming apparatus) having the control unit 3000 with an image processing function, this invention is not limited to this configuration. The image processing, the feature of this invention, may be executed by a host device having a printer driver installed therein (e.g., PC 3010 in FIG. 3), followed by the quantized or divided image data being entered into the printing apparatus. In that case, the host device (external device) connected to the printing apparatus constitutes the image processing apparatus of this invention.

This invention is also realized by program codes making up a computer-readable program that realizes the above image processing function, or by a storage medium containing them. In that case, the image processing is implemented by a computer (or CPU or MPU) in the host device or image forming apparatus reading and executing the program codes. So, the computer-readable program to cause the computer to execute the image processing, and the storage medium containing that program are also included in this invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-072194, filed Mar. 26, 2010, which is hereby incorporated by reference herein in its entirety.

What is claimed is:

1. An image processing apparatus to process input image data for a pixel area of a print medium so that the input image data can be printed on the associated pixel area by a plurality of relative movements, including a first relative movement and a second relative movement which is different from the first relative movement, between a printing unit and the print medium, the printing unit configured to print first dots and second dots having the same color as the first dots and smaller size than the first dots, the image processing apparatus comprising:

a generating unit configured to generate a first multivalue data corresponding to the first dots and a second multivalue data corresponding to the second dots on the basis of the input image data;

a dividing unit configured to divide each of the first multivalue data into pieces of first multivalue data corresponding to each of the first and second relative movements based on a first dividing ratio so as to degrade density unevenness caused by density variation on the occurrence of print position deviation between the first relative movement and the second relative movement and divide the second multivalue data into pieces of second multivalue data corresponding to each of the first and second relative movements based on a second dividing ratio which is different from the first dividing ratio so as to degrade graininess of the image to be printed by the second dots; and a quantization unit configured to quantize each of the pieces of first multivalue data and each of the pieces of second multivalue data respectively.

2. The image processing apparatus according to claim 1, wherein the printing unit further prints third dots having the same color as the first and second dots and a size being smaller than the first dots and larger than the second dots, wherein the generating unit further generates a third multivalue data corresponding to the third dots, and
wherein the dividing unit divides the third multivalue data into pieces of third multivalue data corresponding to each of the first and second relative movements based on a third dividing ratio which is different from both the first and second dividing ratio.

3. The image processing apparatus according to claim 2, wherein the dividing unit divides the first, second and third multivalue data such that a difference between the pieces of third multivalue data is larger than both of a difference between the pieces of the first multivalue data and a difference between the pieces of second multivalue data.

4. The image processing apparatus according to claim 2, wherein the dividing unit divides the first, second and third multivalue data such that a difference between the pieces of third multivalue data is smaller than both of a difference between the pieces of first multivalue data and a difference between the pieces of second multivalue data.

5. The image processing apparatus according to claim 4, wherein the dividing unit divides the third multivalue data such that the piece of third multivalue data corresponding to the first relative movement and the piece of third multivalue data corresponding to the second relative movement are substantially equal each other.

6. A non-transitory storage medium storing a computer-readable program, wherein the computer-readable program causes a computer to function as the image processing apparatus claimed in claim 1.

7. The image processing apparatus according to claim 1, wherein the dividing unit divides each of the first and second multivalue data such that a difference between the pieces of first multivalue data is smaller than a difference between the pieces of second multivalue data.

8. The image processing apparatus according to claim 1, wherein the dividing unit divides each of the first multivalue data such that the piece of first multivalue data corresponding to the first relative movement and the piece of first multivalue data corresponding to the second relative movement are substantially equal to each other.

9. An image processing method to process input image data for a pixel area of a print medium so that the input image data can be printed on the associated pixel area by a plurality of relative movements, including a first relative movement and a second relative movement which is different from the first relative movement, between a printing unit and the print medium, the printing unit configured to print first dots and second dots having the same color as the first dots and smaller size than the first dots, the image processing method comprising the steps of:

using a processor for generating a first multivalue data corresponding to the first dots and a second multivalue data corresponding to the second dots on the basis of the input image data;

using the processor for dividing the first multivalue data into pieces of first multivalue data corresponding to each of the first and second relative movements based on a first dividing ratio so as to degrade density unevenness caused by density variation on the occurrence of print position deviation between the first relative movement and the second relative movement and dividing the second multivalue data into pieces of second multivalue data corresponding to each of the first and second relative movements based on a second dividing ratio which is different from the first dividing ratio so as to degrade graininess of the image to be printed by the second dots; and using the processor for quantizing each of the pieces of first and second multivalue data.

* * * * *